United States Patent
McGuire et al.

(10) Patent No.: US 11,878,293 B2
(45) Date of Patent: Jan. 23, 2024

(54) PROCESS FOR PREPARING A ZEOLITIC MATERIAL HAVING FRAMEWORK TYPE AEI

(71) Applicant: BASF Corporation, Florham Park, NJ (US)

(72) Inventors: Robert McGuire, Florham Park, NJ (US); Faruk Oezkirim, Ludwigshafen (DE); Ulrich Mueller, Ludwigshafen (DE)

(73) Assignee: BASF Corporation, Florham Park, NJ (US)

( * ) Notice: Subject to any disclaimer, the term of this patent is extended or adjusted under 35 U.S.C. 154(b) by 12 days.

(21) Appl. No.: 17/274,809

(22) PCT Filed: Sep. 10, 2019

(86) PCT No.: PCT/EP2019/074066
§ 371 (c)(1),
(2) Date: Mar. 10, 2021

(87) PCT Pub. No.: WO2020/053191
PCT Pub. Date: Mar. 19, 2020

(65) Prior Publication Data
US 2021/0252491 A1    Aug. 19, 2021

(30) Foreign Application Priority Data
Sep. 11, 2018  (EP) .................... 18193662

(51) Int. Cl.
*B01J 29/76* (2006.01)
*B01D 53/86* (2006.01)
*B01J 35/10* (2006.01)
*C01B 39/02* (2006.01)
*C01B 39/48* (2006.01)

(52) U.S. Cl.
CPC .......... *B01J 29/76* (2013.01); *B01D 53/8628* (2013.01); *B01J 35/1019* (2013.01); *C01B 39/026* (2013.01); *C01B 39/48* (2013.01); B01D 2255/20761 (2013.01); B01D 2255/50 (2013.01); B01J 2229/186 (2013.01); C01P 2002/72 (2013.01); C01P 2004/03 (2013.01); C01P 2006/12 (2013.01)

(58) Field of Classification Search
None
See application file for complete search history.

(56) References Cited

U.S. PATENT DOCUMENTS

| 5,958,370 | A | 9/1999 | Zones et al. | |
| 2006/0079723 | A1* | 4/2006 | Mertens | C07C 1/20 502/214 |
| 2012/0269719 | A1* | 10/2012 | Moden | C01B 39/48 423/709 |
| 2013/0280160 | A1* | 10/2013 | Ariga | B01D 53/565 423/239.2 |
| 2015/0118150 | A1 | 4/2015 | Yang et al. | |
| 2017/0113210 | A1* | 4/2017 | Chen | B01J 20/3071 |
| 2017/0128921 | A1* | 5/2017 | Yang | C01B 39/48 |
| 2018/0093257 | A1* | 4/2018 | Chen | B01D 53/9422 |

FOREIGN PATENT DOCUMENTS

| CN | 104010971 | * | 8/2014 |
| CN | 107635920 | A | 1/2018 |
| CN | 106467306 | B | 9/2018 |
| GB | 2193202 | * | 7/1987 |
| JP | 2017206417 | * | 11/2017 |
| WO | 8602018 | * | 4/1986 |
| WO | 2016/080547 | A1 | 5/2016 |
| WO | 2016/166245 | | 10/2016 |
| WO | 2017202495 | * | 11/2017 |

OTHER PUBLICATIONS

Harris, R.K et al., Further Conventions for NMR Shielding and Chemical Shifts, Pure Appl. Chem., vol. 80, No. 1, pp. 59-84, 2008.
International Search Report dated Nov. 11, 2019 for International Application No. PCT/EP2019/074066.

* cited by examiner

*Primary Examiner* — Sheng H Davis
(74) *Attorney, Agent, or Firm* — DLA Piper LLP (US)

(57) ABSTRACT

The present disclosure relates to a process for preparing a zeolitic material having framework type AEI and having a framework structure which comprises a tetravalent element Y, a trivalent element X, and O. Further, the present disclosure relates to a zeolitic material having framework type AEI and having a framework structure which comprises a tetravalent element Y, a trivalent element X, and O, preferably obtained by the process, and further relates to the use of the zeolitic material as a catalytically active material, as a catalyst, or as a catalyst component.

12 Claims, 6 Drawing Sheets

PROCESS FOR PREPARING A ZEOLITIC MATERIAL HAVING FRAMEWORK TYPE AEI

This application is a U.S. national phase entry application under 35 U.S.C. § 371 from PCT International Application No. PCT/EP2019/074066, filed Sep. 10, 2019, which claims priority to European Patent Application No. 18193662.6, filed Sep. 11, 2018; the contents of each application is incorporated herein by reference in its entirety.

The present invention relates to a process for preparing a zeolitic material having framework type AEI and having a framework structure which comprises a tetravalent element Y, a trivalent element X, and O. Further, the present invention relates to a zeolitic material having framework type AEI and having a framework structure which comprises a tetravalent element Y, a trivalent element X, and O, preferably obtainable or obtained by said process, and further relates to the use of said zeolitic material as a catalytically active material, as a catalyst, or as a catalyst component.

Zeolitic materials having framework type AEI are known to be potentially effective as catalysts or catalyst components for treating combustion exhaust gas in industrial applications, for example for converting nitrogen oxides ($NO_x$) in an exhaust gas stream or for the conversion of a C1 compound to one or more olefins. Synthetic AEI zeolitic materials are generally produced by precipitating crystals of the zeolitic material from a synthesis mixture which contains sources of the elements from which the zeolitic framework is built, such as a source of tetravalent element Y, a source of trivalent element X, and O.

WO 2016/080547 A1 discloses a process for preparing AEI-type zeolites wherein along with the above mentioned sources of the elements from which the zeolitic framework is built, in addition a sodium source is employed therein by the addition of an alkali (sodium) source e.g. NaOH.

According to the present invention it was found that instead of including an additional alkali (sodium) source, advantageously one or more of the source of Y and the source of X should comprise sodium. Therefore, it was an object of the present invention to find suitable sources of sodium, wherein one or more of the source of Y and the source of X comprise sodium, which can be employed for preparing a zeolitic material having framework type AEI. Surprisingly, it was found that at least 50 weight-% of the source of sodium, calculated as elemental sodium, should consist of one or more of the source of Y and the source of X comprising sodium.

Therefore, the present invention relates to a process for preparing a zeolitic material having framework type AEI and a framework structure comprising a tetravalent element Y, a trivalent element X, and O, the process comprising (i) preparing a synthesis mixture comprising water, a source of Y, a source of X, an AEI framework structure directing agent, and a source of sodium, wherein one or more of the source of Y and the source of X comprise sodium;

(ii) heating the synthesis mixture obtained from (i) to a temperature in the range of from 100 to 180° C. and keeping the synthesis mixture under autogenous pressure at a temperature in this range for a time in the range of at least 6 h, obtaining the zeolitic material having framework type AEI and a framework structure comprising a tetravalent element Y, a trivalent element X, and O, comprised in its mother liquor;

wherein in the synthesis mixture prepared in (i) subjected to (ii), at least 50 weight-% of the source of sodium, calculated as elemental sodium, consist of one or more of the source of Y and the source of X comprising sodium;

wherein Y is one or more of Si, Ge, S, Ti, and Zr; and wherein X is one or more of Al, B, Ga, and In.

Preferably, in the synthesis mixture prepared in (i) which is subjected to (ii), at least 75 weight-%, more preferably at least 90 weight-%, more preferably at least 95 weight-% of the source of sodium, calculated as elemental sodium, consist of one or more of the source of Y and the source of X comprising sodium. More preferably, in the synthesis mixture prepared in (i) which is subjected to (ii), at least 99 weight-%, more preferably at least 99.5 weight-%, more preferably at least 99.9 weight-% of the source of sodium, calculated as elemental sodium, consist of one or more of the source of Y and the source of X comprising sodium.

Preferably, in the synthesis mixture prepared in (i) which is subjected to (ii), the source of sodium consists of one or more of the source of Y and the source of X comprising sodium.

Preferably, Y comprises, more preferably is Si. Preferably, X comprises, more preferably is Al. More preferably, Y is Si and X is Al.

Generally, according to (i), any suitable source of the tetravalent element Y can be used. Preferably, the source of Y comprises a sodium silicate $(Na_2SiO_2)_n O$ wherein n is an integer preferably in the range of from 1 to 5, more preferably in the range of from 1 to 3, more preferably 1 or 2. Preferably, the source of Y comprises, more preferably is $Na_2SiO_3$. Preferably, the source of Y comprises one or more of a wet-process silica, a dry-process silica, and a colloidal silica. More preferably, the source of Y comprises a colloidal silica. More preferably, the source of Y comprises, more preferably is, $Na_2SiO_3$ and a colloidal silica.

With regard to the source of the tetravalent element Y, it is alternatively preferred that the source of Y does not comprise one or more of a wet-process silica, a dry-process silica, and a colloidal silica, more preferably wherein the source of Y does not comprise a colloidal silica.

Generally, according to (i), any suitable source of the trivalent element X can be used. Preferably, the source of X comprises a sodium aluminate, more preferably one or more $NaAlO_2$, $NaAl(OH)_4$, $Na_2O \cdot Al_2O_3$, $Na_2Al_2O_4$, $Na_5AlO_4$, $Na_7Al_3O_8$, $Na_{17}Al_5O_{16}$, and $NaAl_{11}O_{17}$. More preferably, the source of X comprises, more preferably is $NaAlO_2$.

According to (i), the AEI framework structure directing agent can be any agent which results in the preparation of a zeolitic material having framework type AEI according to (ii). Preferably, the AEI framework structure directing agent comprises one or more quaternary phosphonium cation containing compounds and/or one or more quaternary ammonium cation containing compounds;

wherein the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched ($C_1$-$C_6$)alkyl, preferably ($C_1$-$C_5$)alkyl, more preferably ($C_1$-$C_4$)alkyl, more preferably ($C_2$-$C_3$)alkyl, and more preferably for optionally substituted methyl or ethyl, wherein more preferably $R^1$, $R^2$, $R^3$, and $R^4$ stand for optionally substituted ethyl, more preferably unsubstituted ethyl;

wherein the one or more quaternary ammonium cation containing compounds comprise one or more N,N-dialkyl-dialkylpiperidinium cation containing compounds, preferably one or more N,N—($C_1$-$C_3$)dialkyl-($C_1$-$C_3$)dialkylpiperidinium cation containing compounds, more preferably one or more N,N—(C₁-C₂)dialkyl-(C₁-C₂)dialkylpiperidinium cation containing compounds, wherein more preferably, the one or more quaternary ammonium cation containing compounds are selected from the group consisting of N,N—(C₁-C₂)dialkyl-2,6-(C₁-C₂)dialkylpiperidinium cation and N,N—(C₁-C₂)dialkyl-3,5-(C₁-C₂)di-alkylpiperidinium cation containing compounds, more preferably from the group consisting of N,N-dimethyl-2,6-(C₁-C₂)dialkylpiperidinium cation and N,N-dimethyl-3,5-(C₁-C₂)dialkyl-piperidinium cation containing compounds, more preferably from the group consisting of N,N-dimethyl-2,6-dimethylpiperidinium cation and N,N-dimethyl-3,5-dimethyl-piperidinium cation containing compounds;

wherein the one or more quaternary phosphonium cation containing compounds and/or the one or more quaternary ammonium cation containing compounds are salts, preferably selected from the group consisting of halides, more preferably chloride and/or bromide, more preferably chloride; hydroxide; sulfate; nitrate; phosphate; acetate; and mixtures of two or more thereof, more preferably from the group consisting of chloride, hydroxide, sulfate, and mixtures of two or more thereof, wherein more preferably the one or more quaternary phosphonium cation containing compounds and/or the one or more quaternary ammonium cation containing compounds are hydroxides and/or chlorides, more preferably hydroxides. More preferably, the AEI framework structure directing agent comprises, more preferably is N,N-dimethyl-3,5-dimethylpiperidinium hydroxide.

In the synthesis mixture prepared in (i) which is subjected to (ii), the molar ratio of the source of Y, calculated as $YO_2$, relative to the source of X, calculated as $X_2O_3$, is preferably in the range of from 5:1 to 25:1, more preferably in the range of from 10:1 to 20:1, more preferably in the range of from 13:1 to 17:1.

In the synthesis mixture prepared in (i) which is subjected to (ii), the molar ratio of the source of Y, calculated as $YO_2$, relative to the AEI framework structure directing agent is preferably in the range of from 1:1 to 10:1, more preferably in the range of from 2:1 to 8:1, more preferably in the range of from 3:1 to 5:1.

In the synthesis mixture prepared in (i) which is subjected to (ii), the molar ratio of the source of Y, calculated as $YO_2$, relative to the water is preferably in the range of from 0.01:1 to 1:1, more preferably in the range of from 0.01:1 to 0.5:1, more preferably in the range of from 0.01:1 to 0.1:1.

In addition to the water, a source of Y, a source of X, the AEI framework structure directing agent, and a source of sodium, the synthesis mixture prepared in (i) may comprise one or more further additional components. Preferably, at least 95 weight-%, more preferably at least 98 weight-%, more preferably at least 99 weight-% of the synthesis mixture prepared in (i) which is subjected to (ii) consist of water, the source of Y, the source of X, the AEI framework structure directing agent, and the source of sodium.

In the context of step (i) of the inventive process, the synthesis mixture prepared in (i) which is subjected to (ii) preferably further comprises a crystalline seed material comprising a zeolitic material having framework type AEI and a framework structure comprising a tetravalent element Y, a trivalent element X, and O. Preferably, in the synthesis mixture prepared in (i) which is subjected to (ii), the ratio of Si, comprised in the zeolitic material having framework type AEI comprised in the crystalline seed material and calculated as elemental Si, relative to Al, comprised in the crystalline seed material and calculated as elemental Al, said ratio being defined as Si:Al, is in the range of from 5:1 to 11:1, more preferably in the range of from 6:1 to 10:1, more preferably in the range of from 7:1 to 9:1.

In the context of step (i) of the inventive process, it is alternatively preferred that in the synthesis mixture prepared in (i) which is subjected to (ii), the ratio of Si, comprised in the zeolitic material having framework type AEI comprised in the crystalline seed material and calculated as elemental Si, relative to Al, comprised in the crystalline seed material and calculated as elemental Al, said ratio being defined as Si:Al, is in the range of from 6:1 to 12:1, more preferably in the range of from 7:1 to 11:1, more preferably in the range of from 8:1 to 10:1.

Preferably, in the synthesis mixture prepared in (i) which is subjected to (ii), the molar ratio of the source of Y, calculated as $YO_2$, relative to Y comprised in the seed material, calculated as $YO_2$, is in the range of from 1:1 to 15:1, more preferably in the range of from 1:1 to 10:1, more preferably in the range of from 1:1 to 5:1.

In the context of step (i) of the inventive process, it is alternatively preferred that in the synthesis mixture prepared in (i) which is subjected to (ii), the molar ratio of the source of Y, calculated as $YO_2$, relative to Y comprised in the seed material, calculated as $YO_2$, is in the range of from 1:1 to 1:1.5, more preferably in the range of from 1:1 to 1:1.4, more preferably in the range of from 1:1 to 1:1.3.

Preferably, at least 95 weight-%, more preferably at least 98 weight-%, more preferably at least 99 weight-% of the synthesis mixture prepared in (i) which is subjected to (ii) consist of water, the source of Y, the source of X, the AEI framework structure directing agent, the source of sodium and the crystalline seed material.

Step (ii) of the inventive process comprises heating the synthesis mixture obtained from (i) to a temperature in the range of from 100 to 180° C. and keeping the synthesis mixture under autogenous pressure. Preferably, (ii) is carried out in an autoclave. Preferably, the synthesis mixture prepared in (i) is heated to the temperature in (ii) with a heating rate in the range of from 0.5 to 4 K/min, more preferably in the range of from 1 to 3 K/min.

Preferably, heating the synthesis mixture obtained from (i) in (ii) is carried out at a temperature in the range of from 140 to 160° C., more preferably in the range of from 150 to 170° C.

In the context of step (ii) of the inventive process, it is alternatively preferred that heating the synthesis mixture obtained from (i) in (ii) is carried out at a temperature in the range of from 100 to 140° C., more preferably in the range of from 110 to 130° C.

Preferably, heating the synthesis mixture obtained from (i) in (ii) comprises agitating, more preferably mechanically agitating, more preferably stirring the synthesis mixture. Preferably, heating the synthesis mixture obtained from (i) in (ii) is carried out for a time in the range of from 8 to 144 h, more preferably in the range of from 12 to 120 h, more preferably in the range of from 24 to 72 h.

In the context of step (ii) of the inventive process, it is alternatively preferred that heating the synthesis mixture obtained from (i) in (ii) is carried out for a time in the range of from 24 h to 216 h, more preferably in the range of from 48 to 192 h, more preferably in the range of from 72 to 168 h, more preferably in the range of from 96 to 144 h.

Since step (ii) of the inventive process comprises heating the synthesis mixture obtained from (i) under autogenous pressure it is preferred (ii) further comprises depressurizing the mixture. Either before, during, or after depressurizing, the inventive process preferably further comprises (iii) cooling the mixture obtained from (ii), preferably to a temperature in the range of from 10 to 50° C., more preferably in the range of from 20 to 35° C.;
(iv) separating the zeolitic material from the mixture obtained from (ii), said separating preferably comprising
  (iv.1) subjecting the mixture obtained from (ii) to a solid-liquid separation method, preferably comprising a filtration method or a spraying method;
  (iv.2) preferably washing the zeolitic material obtained from (iv.1);
  (iv.3) preferably drying the zeolitic material obtained from (iv.1) or from (iv.2), preferably from (iv.2), in a gas atmosphere having a temperature in the range of from 80 to 170° C., more preferably in the range of from 100 to 140° C., more preferably in the range of from 100 to 130° C.;
(v) preferably calcining the zeolitic material obtained from (iv) in a gas atmosphere having a temperature in the range of from 400 to 600° C.;

Preferably, the gas atmosphere in (iv.3) comprises oxygen, more preferably is air, lean air, or synthetic air, and wherein the gas atmosphere in (v) comprises oxygen, more preferably is air, lean air, or synthetic air.

In the context of the inventive process, the zeolitic material obtained having framework type AEI and a framework structure comprising a tetravalent element Y, a trivalent element X, and O, preferably exhibits one or more of the following characteristics (1) to (3), more preferably two or more of the following characteristics (1) to (3), more preferably the following characteristics (1) to (3):
(1) a BET specific surface area in the range of from 200 to 340 m$^2$/g, preferably in the range of from 220 to 320 m$^2$/g, more preferably in the range of from 240 to 300 m$^2$/g, more preferably in the range of from 260 to 280 m$^2$/g, determined as described in Reference Example 1.2 herein;
(2) a crystallinity of at least 60%, preferably at least 70%, more preferably at least 80%, more preferably at least 90%, wherein the crystallinity is determined as described in Reference Example 1.1 herein;
(3) a Langmuir surface area in the range of from 290 to 430 m$^2$/g, preferably in the range of from 310 to 410 m$^2$/g, more preferably in the range of from 330 to 390 m$^2$/g, more preferably in the range of from 350 to 370 m$^2$/g, determined according to DIN 66131.

The inventive process preferably further comprises
(vi) subjecting the zeolitic material obtained from (iv) or (v), more preferably from (v), to ion exchange conditions, comprising bringing a solution comprising ammonium ions in contact with the zeolitic material obtained from (iv) or (v), more preferably from (v), obtaining a zeolitic material having framework type AEI in its ammonium form.

The solution comprising ammonium ions according to (vi) preferably is an aqueous solution comprising a dissolved ammonium salt, preferably a dissolved inorganic ammonium salt, more preferably dissolved ammonium nitrate. Preferably, the solution comprising ammonium ions according to (vi) has an ammonium concentration in the range of from 1 to 5 mol/l, more preferably in the range of from 1.5 to 4 mol/l, more preferably in the range of from 2 to 3 mol/l.

As to step (vi), it is preferred that according to (vi), the solution comprising ammonium ions is brought in contact with the zeolitic material obtained from (iv) or (v), more preferably from (v), at a temperature of the solution in the range of from 50 to 95° C., more preferably in the range of from 60 to 90° C., more preferably in the range of from 70 to 85° C. Preferably, the solution comprising ammonium ions is brought in contact with the zeolitic material obtained from (iv) or (v), more preferably from (v), for a period of time in the range of from 1 to 5 hours, more preferably from 2 to 4 hours, more preferably in the range of from 2.5 to 3.5 h. Preferably, bringing the solution in contact with the zeolitic material according to (vi) is repeated at least once, more preferably once or twice, more preferably once. Preferably, bringing the solution in contact with the zeolitic material according to (vi) comprises one or more of impregnating the zeolitic material with the solution and spraying the solution onto the zeolitic material, more preferably impregnating the zeolitic material with the solution.

The inventive process preferably further comprises
(vii) calcining the zeolitic material obtained from (vi), obtaining the H-form of the zeolitic material.

Preferably, according to (vii), the zeolitic material is calcined in a gas atmosphere having a temperature in the range of from 300 to 700° C., more preferably in the range of from 350 to 600° C., more preferably in the range of from 400 to 600° C., more preferably in the range of from 450 to 550° C. Preferably, the gas atmosphere comprises oxygen, more preferably is air, lean air, or synthetic air.

Generally, it is possible that according to the process of the present invention, the conversion process described above resulting in the zeolitic material having framework type AEI is an essentially complete conversion, and the material obtained essentially consists of the zeolitic material having framework type AEI. However, it is also possible that the conversion is partially incomplete, and in the material obtained, not only the zeolitic material having framework type AEI is comprised, but also one or more other materials, preferably one or more zeolitic materials having a framework type other then AEI, preferably a zeolitic material having a framework type AFI or GME.

Preferably, regarding such a respectively obtained composition, more than 50 weight-%, more preferably at least 55 weight-%, more preferably at least 60 weight-%, more preferably at least 70 weight-%, more preferably at least 80 weight-% of the solid oxidic composition comprising a zeolitic material having framework type AEI and having a framework structure comprising a tetravalent element Y, a trivalent element X, and O, consist of the zeolitic material having framework type AEI and having a framework structure comprising a tetravalent element Y, a trivalent element X, and O, preferably determined as described in Reference Example 1.1 herein. Preferably, the solid oxidic composition comprises the zeolitic material having framework type AEI and having a framework structure comprising a tetravalent element Y, a trivalent element X, and O, and further comprises one or more zeolitic materials having a framework type other than AEI. Preferably, the solid oxidic composition comprises, preferably consists of a zeolitic material having framework type AEI and a zeolitic material having framework type AFI. It is alternatively preferred that the solid oxidic composition comprises, preferably consists of a zeolitic material having framework type AEI and a zeolitic material having framework type GME.

Such a partially incomplete conversion leading to said composition comprising the zeolitic material having framework type AEI is taken into account in the second set of preferred embodiments of the present invention which is directed, e.g., to a process for preparing a solid oxidic composition. For the sake of completeness, it is mentioned that also for these embodiments, in case the conversion is complete, the composition is to be understood as consisting of the zeolitic material having framework type AEI. In any case, even if the conversion is partially incomplete, the invention nevertheless is directed, e.g., to a process for preparing a zeolitic material having framework type AEI since this zeolitic material is mandatorily comprised in said composition.

Depending on the intended use of the zeolitic material, the material, preferably obtained from (vii) can be employed as such. Further, it is conceivable that this zeolitic material is subjected to one or more further post-treatment steps. For example, the zeolitic material which is most preferably obtained as a powder can be suitably processed to a molding or a shaped body by any suitably method, including, but no restricted to, extruding, tabletting, spraying and the like. Preferably, the shaped body may have a rectangular, a triangular, a hexagonal, a square, an oval or a circular cross section, and/or preferably is in the form of a star, a tablet, a sphere, a cylinder, a strand, or a hollow cylinder. When preparing a shaped body, one or more binders can be used which may be chosen according to the intended use of the shaped body. Possible binder materials include, but are not restricted to, graphite, silica, titania, zirconia, alumina, and a mixed oxide of two or more of silicon, titanium and zirconium. The weight ratio of the zeolitic material relative to the binder is generally not subject to any specific restrictions and may be, for example, in the range of from 10:1 to 1:10. According to a further example according to which the zeolitic material is used, for example, as a catalyst or as a catalyst component for treating an exhaust gas stream, for example an exhaust gas stream of an engine, it is possible that the zeolitic material is used as a component of a washcoat to be applied onto a suitable substrate, such as a wall-flow filter or the like.

According to a preferred embodiment of the present invention, the zeolitic material is subjected to a post-treatment which comprises supporting a metal M on the zeolitic material. Therefore, the present invention further preferably relates to the process as described above, further comprising (viii) supporting a metal M on the zeolitic material, preferably on the zeolitic material obtained from (iv) or (v).

As to step (viii), it is preferred that (viii) comprises (viii.1) preparing a mixture comprising the zeolitic material, preferably the zeolitic material obtained from (iv) or (v), a source of a metal M, a solvent for the source of the metal M, and optionally an acid, preferably an organic acid, wherein the solvent preferably comprises water, the source of the metal M preferably comprises a salt of the metal M and the acid preferably comprises acetic acid;

(viii.2) heating the mixture prepared in (viii.1) to a temperature in the range of from 30 to 90° C., preferably in the range of from 40 to 80° C.;

(viii.3) preferably cooling, more preferably rapid-cooling the mixture obtained from (viii.2);

(viii.4) separating the zeolitic material comprising the metal M from the mixture obtained from (viii.2) or (viii.3), preferably from (viii.3), the separating preferably comprising washing the zeolitic material comprising the metal M;

(viii.5) preferably drying the zeolitic material comprising the metal M obtained from (viii.4) in a gas atmosphere, preferably at a temperature of the gas atmosphere in the range of from 90 to 200° C., more preferably in the range of from 100 to 150° C., wherein the gas atmosphere preferably comprises oxygen;

(viii.6) preferably calcining the zeolitic material comprising the metal M obtained from (viii.4) or (viii.5), preferably (viii.5), in a gas atmosphere, preferably at a temperature of the gas atmosphere in the range of from 350 to 600° C., more preferably in the range of from 400 to 550° C., wherein the gas atmosphere preferably comprises oxygen.

Regarding the metal M of step (viii), preferably the metal M is a transition metal of groups 7 to 12 of the periodic system of elements. More preferably, the metal M is one or more of Fe, Co, Ni, Cu, and Zn, more preferably one or more of Fe and Cu. More preferably, the metal M comprises, more preferably is Cu. Preferably, according to (viii), the metal M is supported on the zeolitic material in an amount in the range of from 1 to 9 weight-%, more preferably in the range of from 1.5 to 8 weight-%, more preferably in the range of from 2 to 7 weight-%, more preferably in the range of from 2.5 to 6 weight-%, more preferably in the range of from 3 to 5 weight-%, calculated as MO and based on the total weight of the zeolitic material.

With regard to step (viii), it is alternatively preferred that according to (viii), the metal M is supported on the zeolitic material in an amount in the range of from 1 to 11 weight-%, more preferably in the range of from 2 to 10 weight-%, more preferably in the range of from 3 to 9 weight-%, more preferably in the range of from 4 to 8 weight-%, more preferably in the range of from 5 to 7 weight-%, calculated as MO and based on the total weight of the zeolitic material.

The present invention further relates to a zeolitic material having framework type AEI and having a framework structure which comprises a tetravalent element Y, a trivalent element X, and O, obtainable or obtained or preparable or prepared by a process described herein above.

The present invention yet further relates to a zeolitic material comprising a metal M, having framework type AEI and having a framework structure which comprises a tetravalent element Y, a trivalent element X, and O, obtainable or obtained or preparable or prepared by a process as described herein above comprising supporting a metal M on the zeolitic material according to (viii).

The present invention yet further relates to a zeolitic material having framework type AEI, preferably the zeolitic material obtainable or obtained or preparable or prepared by a process as described herein above, more preferably comprising supporting a metal M on the zeolitic material according to (viii), said zeolitic material having a framework structure which comprises a tetravalent element Y, a trivalent element X, and O, exhibiting a $^{27}$Al solid-state NMR spectrum determined as described in Reference Example 1.6, comprising resonances and a peak maximum in the range of from 62.0 to 54.0 ppm, preferably in the range of from 59.0 to 57.0 ppm, more preferably in the range of from 58.5 to 57.5 ppm, preferably comprising a full width at half height in the range of from 6.2 to 8.2 ppm, preferably in the range of from 6.5 to 7.9 ppm, more preferably in the range of from 6.9 to 7.5 ppm;

wherein Y is one or more of Si, Ge, S, Ti, and Zr; and
wherein X is one or more of Al, B, Ga, and In;
wherein Y preferably comprises, more preferably is Si;
wherein X preferably comprises, more preferably is Al.

Preferably, said zeolitic material exhibiting a $^{27}$Al solid-state NMR spectrum determined as described in Reference Example 1.6, comprising a ratio of the integral from 81 to 35 ppm to the integral from 35 to −10 ppm of at least 95:5, preferably of at least 98:2, more preferably of at least 99:1.

Preferably, said zeolitic material exhibiting a $^{29}$Si solid-state NMR spectrum determined as described in Reference Example 1.7, comprising resonances and a peak maximum in the range of from −108.0 to −113.0 ppm, more preferably in the range of from −109.5 to −111.5 ppm, more preferably in the range of from −110.1 to −110.9 ppm. Preferably, said zeolitic material exhibiting a $^{29}$Si solid-state NMR spectrum determined as described in Reference Example 1.7, additionally comprising resonances and a peak maximum in the range of from −102.0 to −107.0 ppm, more preferably in the range of from −103.5 to −105.5 ppm, more preferably in the range of from −104.1 to −104.9 ppm. Preferably, said zeolitic material exhibiting a $^{29}$Si solid-state NMR spectrum determined as described in Reference Example 1.7, additionally comprising resonances and a peak maximum in the range of from −96.0 ppm to −101.0 ppm, more preferably in the range of from −97.5 to −99.5 ppm, more preferably in the range of from −98.1 to −98.9 ppm. Preferably, said zeolitic material exhibiting a $^{29}$Si solid-state NMR spectrum determined as described in Reference Example 1.7, comprising three integrals from −94.7 to −101.1 ppm and from −101.1 to −107.7 and from −107.7 to −115.7, with their total sum normalized to 100 being 25 (+/−7): 50 (+/−7): 25 (+/−7), preferably 25 (+/−4): 50 (+/−4): 25 (+/−4), more preferably 25 (+/−2): 50 (+/−2): 25 (+/−2).

The zeolitic material of the present invention having framework type AEI and a framework structure comprising a tetravalent element Y, a trivalent element X, and O can be used for any conceivable purpose, including, but not limited to, an absorbent, a molecular sieve, a catalyst, a catalyst carrier or an intermediate for preparing one or more thereof. Preferably, the zeolitic material of the present invention is used as a catalytically active material, as a catalyst, or as a catalyst component. More preferably, the zeolitic material of the present invention is used for the selective catalytic reduction of nitrogen oxides in an exhaust gas stream, more preferably an exhaust gas stream from a diesel engine. More preferably, the zeolitic material of the present invention is used for the conversion of a C1 compound to one or more olefins, more preferably for the conversion of methanol to one or more olefins or the conversion of a synthetic gas comprising carbon monoxide and hydrogen to one or more olefins.

Further, the present invention relates to a method for selectively catalytically reducing nitrogen oxides in an exhaust gas stream, preferably an exhaust gas stream from a diesel engine, said method comprising bringing said exhaust gas stream in contact with a catalyst comprising the zeolitic material according to the present invention.

Yet further, the present invention relates to a method for selectively catalytically reducing nitrogen oxides in an exhaust gas stream, preferably an exhaust gas stream from a diesel engine, said method comprising preparing a zeolitic material having framework type AEI and having a framework structure which comprises a tetravalent element Y, a trivalent element X, and O by a process according to a process according to the present invention, preferably a process according to the present invention which comprises supporting a metal M on the zeolitic material according to (viii), and bringing said exhaust gas stream in contact with a catalyst comprising said zeolitic material.

The present invention also relates to a method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the zeolitic material according to the present invention.

The present invention also relates to a method for catalytically converting a C1 compound to one or more olefins, preferably converting methanol to one or more olefins or converting a synthetic gas comprising carbon monoxide and hydrogen to one or more olefins, said method comprising preparing a zeolitic material having framework type AEI and having a framework structure which comprises a tetravalent element Y, a trivalent element X, and O by a process according to the present invention, preferably a process according to the present invention which comprises supporting a metal M on the zeolitic material according to (viii), and bringing said C1 compound in contact with a catalyst comprising said zeolitic material.

Further, the present invention relates to a catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the zeolitic material according to the present invention.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing a zeolitic material having framework type AEI and a framework structure comprising a tetravalent element Y, a trivalent element X, and O, the process comprising
   (i) preparing a synthesis mixture comprising water, a source of Y, a source of X, an AEI framework structure directing agent, and a source of sodium, wherein one or more of the source of Y and the source of X comprise sodium;
   (ii) heating the synthesis mixture obtained from (i) to a temperature in the range of from 100 to 180° C. and keeping the synthesis mixture under autogenous pressure at a temperature in this range for a time in the range of at least 6 h, obtaining the zeolitic material having framework type AEI and a framework structure comprising a tetravalent element Y, a trivalent element X, and O, comprised in its mother liquor;
   wherein in the synthesis mixture prepared in (i) and subjected to (ii), at least 50 weight-% of the source of sodium, calculated as elemental sodium, consist of one or more of the source of Y and the source of X comprising sodium;
   wherein Y is one or more of Si, Ge, S, Ti, and Zr; and wherein X is one or more of Al, B, Ga, and In.
2. The process of embodiment 1, wherein in the synthesis mixture prepared in (i) which is subjected to (ii), at least 75 weight-%, preferably at least 90 weight-%, more preferably at least 95 weight-% of the source of sodium, calculated as elemental sodium, consist of one or more of the source of Y and the source of X comprising sodium.
3. The process of embodiment 1 or 2, wherein in the synthesis mixture prepared in (i) which is subjected to (ii), at least 99 weight-%, preferably at least 99.5 weight-%, more preferably at least 99.9 weight-% of the source of sodium, calculated as elemental sodium, consist of one or more of the source of Y and the source of X comprising sodium.
4. The process of any one of embodiments 1 to 3, wherein in the synthesis mixture prepared in (i) which is subjected to (ii), the source of sodium consists of one or more of the source of Y and the source of X comprising sodium.
5. The process of any one of embodiments 1 to 4, wherein Y comprises, preferably is Si.
6. The process of any one of embodiments 1 to 5, wherein X comprises, preferably is Al.
7. The process of any one of embodiments 1 to 6, wherein Y is Si and X is Al.
8. The process of any one of embodiments 1 to 7, wherein the source of Y comprises a sodium silicate $(Na_2SiO_2)_nO$ wherein n is an integer preferably in the range of from 1 to 5, more preferably in the range of from 1 to 3, more preferably 1 or 2.
9. The process of any one of embodiments 1 to 8, wherein the source of Y comprises $Na_2SiO_3$.
10. The process of any one of embodiments 1 to 9, wherein the source of Y is $Na_2SiO_3$.
11. The process of any one of embodiments 1 to 10, wherein the source of Y comprises one or more of a wet-process silica, a dry-process silica, and a colloidal silica.
12. The process of embodiment 11, wherein the source of Y comprises a colloidal silica.
13. The process of embodiment 11 or 12, wherein the source of Y comprises, preferably is, $Na_2SiO_3$ and a colloidal silica.
14. The process of any one of embodiments 1 to 9, wherein the source of Y does not comprise one or more of a wet-process silica, a dry-process silica, and a colloidal silica, preferably wherein the source of Y does not comprise a colloidal silica.
15. The process of any one of embodiments 1 to 14, wherein the source of X comprises a sodium aluminate, preferably one or more $NaAlO_2$, $NaAl(OH)_4$, $Na_2O \cdot Al_2O_3$, $Na_2Al_2O_4$, $Na_5AlO_4$, $Na_7Al_3O_8$, $Na_{17}Al_5O_{16}$, and $NaAl_{11}O_{17}$.
16. The process of any one of embodiments 1 to 15, wherein the source of X comprises $NaAlO_2$.
17. The process of any one of embodiments 1 to 16, wherein the source of X is $NaAlO_2$.
18. The process of any one of embodiments 1 to 17, wherein the AEI framework structure directing agent comprises one or more quaternary phosphonium cation containing compounds and/or one or more quaternary ammonium cation containing compounds; wherein the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched $(C_1-C_6)$alkyl, preferably $(C_1-C_5)$ alkyl, more preferably $(C_1-C_4)$alkyl, more preferably $(C_2-C_3)$alkyl, and even more preferably for optionally substituted methyl or ethyl, wherein even more preferably $R^1$, $R^2$, $R^3$, and $R^4$ stand for optionally substituted ethyl, preferably unsubstituted ethyl; wherein the one or more quaternary ammonium cation containing compounds comprise one or more N,N-dialkyl-dialkylpiperidinium cation containing compounds, preferably one or more N,N—$(C_1-C_3)$dialkyl-$(C_1-C_3)$dialkylpiperidinium cation containing compounds, more preferably one or more N,N—$(C_1-C_2)$dialkyl-$(C_1-C_2)$ dialkylpiperidinium cation containing compounds, wherein more preferably, the one or more quaternary ammonium cation containing compounds are selected from the group consisting of N,N—$(C_1-C_2)$dialkyl-2,6-$(C_1-C_2)$dialkylpiperidinium cation and N,N—$(C_1-C_2)$dialkyl-3,5-$(C_1-C_2)$di-alkylpiperidinium cation containing compounds, more preferably from the group consisting of N,N-dimethyl-2,6-$(C_1-C_2)$dialkylpiperidinium cation and N,N-dimethyl-3,5-$(C_1-C_2)$dialkyl-piperidinium cation containing compounds, more preferably from the group consisting of N,N-dimethyl-2,6-dimethylpiperidinium cation and N,N-dimethyl-3,5-dimethyl-piperidinium cation containing compounds;

wherein the one or more quaternary phosphonium cation containing compounds and/or the one or more quaternary ammonium cation containing compounds are salts, preferably selected from the group consisting of halides, preferably chloride and/or bromide, more preferably chloride; hydroxide; sulfate; nitrate; phosphate; acetate; and mixtures of two or more thereof, more preferably from the group consisting of chloride, hydroxide, sulfate, and mixtures of two or more thereof, wherein more preferably the one or more quaternary phosphonium cation containing compounds and/or the one or more quaternary ammonium cation containing compounds are hydroxides and/or chlorides, more preferably hydroxides.

19. The process of any one of embodiments 1 to 18, wherein the AEI framework structure directing agent comprises, preferably is N,N-dimethyl-3,5-dimethylpiperidinium hydroxide.
20. The process of any one of embodiments 1 to 19, wherein in the synthesis mixture prepared in (i) which is subjected to (ii), the molar ratio of the source of Y, calculated as $YO_2$, relative to the source of X, calculated as $X_2O_3$, is in the range of from 5:1 to 25:1, preferably in the range of from 10:1 to 20:1, more preferably in the range of from 13:1 to 17:1.
21. The process of any one of embodiments 1 to 20, wherein in the synthesis mixture prepared in (i) which is subjected to (ii), the molar ratio of the source of Y, calculated as $YO_2$, relative to the AEI framework structure directing agent is in the range of from 1:1 to 10:1, preferably in the range of from 2:1 to 8:1, more preferably in the range of from 3:1 to 5:1.
22. The process of any one of embodiments 1 to 21, wherein in the synthesis mixture prepared in (i) which is subjected to (ii), the molar ratio of the source of Y, calculated as $YO_2$, relative to the water is in the range of from 0.01:1 to 1:1, preferably in the range of from 0.01:1 to 0.5:1, more preferably in the range of from 0.01:1 to 0.1:1.
23. The process of any one of embodiments 1 to 22, wherein at least 95 weight-%, preferably at least 98 weight-%, more preferably at least 99 weight-% of the synthesis mixture prepared in (i) which is subjected to (ii) consist of water, the source of Y, the source of X, the AEI framework structure directing agent, and the source of sodium.
24. The process of any one of embodiments 1 to 23, wherein the synthesis mixture prepared in (i) which is subjected to (ii) further comprises a crystalline seed material comprising a zeolitic material having framework type AEI and a framework structure comprising a tetravalent element Y, a trivalent element X, and O.

25. The process of embodiment 24, wherein in the synthesis mixture prepared in (i) which is subjected to (ii), the ratio of Si, comprised in the zeolitic material having framework type AEI comprised in the crystalline seed material and calculated as elemental Si, relative to Al, comprised in the crystalline seed material and calculated as elemental Al, said ratio being defined as Si:Al, is in the range of from 5:1 to 11:1, preferably in the range of from 6:1 to 10:1, more preferably in the range of from 7:1 to 9:1.

26. The process of embodiment 24, wherein in the synthesis mixture prepared in (i) which is subjected to (ii), the ratio of Si, comprised in the zeolitic material having framework type AEI comprised in the crystalline seed material and calculated as elemental Si, relative to Al, comprised in the crystalline seed material and calculated as elemental Al, said ratio being defined as Si:Al, is in the range of from 6:1 to 12:1, preferably in the range of from 7:1 to 11:1, more preferably in the range of from 8:1 to 10:1.

27. The process of any one of embodiments 24 to 26, wherein in the synthesis mixture prepared in (i) which is subjected to (ii), the molar ratio of the source of Y, calculated as $YO_2$, relative to Y comprised in the seed material, calculated as $YO_2$, is in the range of from 1:1 to 15:1, preferably in the range of from 1:1 to 10:1, more preferably in the range of from 1:1 to 5:1.

28. The process of any one of embodiments 24 to 26, wherein in the synthesis mixture prepared in (i) which is subjected to (ii), the molar ratio of the source of Y, calculated as $YO_2$, relative to Y comprised in the seed material, calculated as $YO_2$, is in the range of from 1:1 to 1:1.5, preferably in the range of from 1:1 to 1:1.4, more preferably in the range of from 1:1 to 1:1.3.

29. The process of any one of embodiments 24 to 28, wherein at least 95 weight-%, preferably at least 98 weight-%, more preferably at least 99 weight-% of the synthesis mixture prepared in (i) which is subjected to (ii) consist of water, the source of Y, the source of X, the AEI framework structure directing agent, the source of sodium and the crystalline seed material.

30. The process according to any one of embodiments 1 to 29, wherein (ii) is carried out in an autoclave.

31. The process of any one of embodiments 1 to 30, wherein the synthesis mixture prepared in (i) is heated to the temperature in (ii) with a heating rate in the range of from 0.5 to 4 K/min, preferably in the range of from 1 to 3 K/min.

32. The process of any one of embodiments 1 to 31, wherein heating the synthesis mixture obtained from (i) in (ii) is carried out at a temperature in the range of from 140 to 160° C., preferably in the range of from 150 to 170° C.

33. The process of any one of embodiments 1 to 31, wherein heating the synthesis mixture obtained from (i) in (ii) is carried out at a temperature in the range of from 100 to 140° C., preferably in the range of from 110 to 130° C.

34. The process of any one of embodiments 1 to 33, wherein heating the synthesis mixture obtained from (i) in (ii) comprises agitating, preferably mechanically agitating, more preferably stirring the synthesis mixture.

35. The process of any one of embodiments 1 to 34, wherein heating the synthesis mixture obtained from (i) in (ii) is carried out for a time in the range of from 8 to 144 h, preferably in the range of from 12 to 120 h, more preferably in the range of from 24 to 72 h.

36. The process of any one of embodiments 1 to 34, wherein heating the synthesis mixture obtained from (i) in (ii) is carried out for a time in the range of from 24 h to 216 h, preferably in the range of from 48 to 192 h, more preferably in the range of from 72 to 168 h, more preferably in the range of from 96 to 144 h.

37. The process of any one of embodiments 1 to 36, further comprising
    (iii) cooling the mixture obtained from (ii), preferably to a temperature in the range of from 10 to 50° C., more preferably in the range of from 20 to 35° C.;
    (iv) separating the zeolitic material from the mixture obtained from (ii), said separating preferably comprising
        (iv.1) subjecting the mixture obtained from (ii) to a solid-liquid separation method, preferably comprising a filtration method or a spraying method;
        (iv.2) preferably washing the zeolitic material obtained from (iv.1);
        (iv.3) preferably drying the zeolitic material obtained from (iv.1) or from (iv.2), preferably from (iv.2), in a gas atmosphere having a temperature in the range of from 80 to 170° C., preferably in the range of from 100 to 140° C., more preferably in the range of from 100 to 130° C.;
    (v) preferably calcining the zeolitic material obtained from (iv) in a gas atmosphere having a temperature in the range of from 400 to 600° C.;

38. The process of embodiment 37, wherein the gas atmosphere in (iv.3) comprises oxygen, preferably is air, lean air, or synthetic air, and wherein the gas atmosphere in (v) comprises oxygen, preferably is air, lean air, or synthetic air.

39. The process of any one of embodiments 1 to 38, preferably according to embodiment 37 or 38, wherein the zeolitic material obtained having framework type AEI and a framework structure comprising a tetravalent element Y, a trivalent element X, and O exhibits one or more of the following characteristics (1) to (3), preferably two or more of the following characteristics (1) to (3), more preferably the following characteristics (1) to (3):
    (1) a BET specific surface area in the range of from 200 to 340 m$^2$/g, preferably in the range of from 220 to 320 m$^2$/g, more preferably in the range of from 240 to 300 m$^2$/g, more preferably in the range of from 260 to 280 m$^2$/g, determined as described in Reference Example 1.2 herein;
    (2) a crystallinity of at least 60%, preferably at least 70%, more preferably at least 80%, more preferably at least 90%, wherein the crystallinity is determined as described in Reference Example 1.1 herein;
    (3) a Langmuir surface area in the range of from 290 to 430 m$^2$/g, preferably in the range of from 310 to 410 m$^2$/g, more preferably in the range of from 330 to 390 m$^2$/g, more preferably in the range of from 350 to 370 m$^2$/g, determined according to DIN 66131.

40. The process of any one of embodiments 36 to 39, further comprising
    (vi) subjecting the zeolitic material obtained from (iv) or (v), preferably from (v), to ion exchange conditions, comprising bringing a solution comprising ammonium ions in contact with the zeolitic material obtained from (iv) or (v), preferably from (v), obtaining a zeolitic material having framework type AEI in its ammonium form.
41. The process of embodiment 40, wherein the solution comprising ammonium ions according to (vi) is an aqueous solution comprising a dissolved ammonium salt, preferably a dissolved inorganic ammonium salt, more preferably dissolved ammonium nitrate.
42. The process of embodiment 40 or 41, wherein the solution comprising ammonium ions according to (vi) has an ammonium concentration in the range of from 1 to 5 mol/l, preferably in the range of from 1.5 to 4 mol/l, more preferably in the range of from 2 to 3 mol/l.
43. The process of any one of embodiments 40 to 42, wherein according to (vi), the solution comprising ammonium ions is brought in contact with the zeolitic material obtained from (iv) or (v), preferably from (v), at a temperature of the solution in the range of from 50 to 95° C., preferably in the range of from 60 to 90° C., more preferably in the range of from 70 to 85° C.
44. The process of embodiment 43, wherein the solution comprising ammonium ions is brought in contact with the zeolitic material obtained from (iv) or (v), preferably from (v), for a period of time in the range of from 1 to 5 hours, preferably from 2 to 4 hours, more preferably in the range of from 2.5 to 3.5 h.
45. The process of any one of embodiments 40 to 44, wherein bringing the solution in contact with the zeolitic material according to (vi) is repeated at least once, preferably once or twice, more preferably once.
46. The process of any one of embodiments 40 to 45, wherein bringing the solution in contact with the zeolitic material according to (vi) comprises one or more of impregnating the zeolitic material with the solution and spraying the solution onto the zeolitic material, preferably impregnating the zeolitic material with the solution.
47. The process of any one of embodiments 40 to 46, further comprising
   (vii) calcining the zeolitic material obtained from (vi), obtaining the H-form of the zeolitic material.
48. The process of embodiment 47, wherein according to (vii), the zeolitic material is calcined in a gas atmosphere having a temperature in the range of from 300 to 700° C., preferably in the range of from 350 to 600° C., more preferably in the range of from 400 to 600° C., more preferably in the range of from 450 to 550° C.
49. The process of embodiment 48, wherein the gas atmosphere comprises oxygen, preferably is air, lean air, or synthetic air.
50. The process of any one of embodiments 1 to 49, preferably any one of embodiments 37 to 49, more preferably any one of embodiments 40 to 46, further comprising
   (viii) supporting a metal M on the zeolitic material, preferably on the zeolitic material obtained from (iv) or (v).
51. The process of embodiment 50, wherein (viii) comprises
   (viii.1) preparing a mixture comprising the zeolitic material, preferably the zeolitic material obtained from (iv) or (v), a source of a metal M, a solvent for the source of the metal M, and optionally an acid, preferably an organic acid, wherein the solvent preferably comprises water, the source of the metal M preferably comprises a salt of the metal M and the acid preferably comprises acetic acid;
   (viii.2) heating the mixture prepared in (viii.1) to a temperature in the range of from 30 to 90° C., preferably in the range of from 40 to 80° C.;
   (viii.3) preferably cooling, more preferably rapid-cooling the mixture obtained from (viii.2);
   (viii.4) separating the zeolitic material comprising the metal M from the mixture obtained from (viii.2) or (viii.3), preferably from (viii.3), the separating preferably comprising washing the zeolitic material comprising the metal M;
   (viii.5) preferably drying the zeolitic material comprising the metal M obtained from (viii.4) in a gas atmosphere, preferably at a temperature of the gas atmosphere in the range of from 90 to 200° C., more preferably in the range of from 100 to 150° C., wherein the gas atmosphere preferably comprises oxygen;
   (viii.6) preferably calcining the zeolitic material comprising the metal M obtained from (viii.4) or (viii.5), preferably (viii.5), in a gas atmosphere, preferably at a temperature of the gas atmosphere in the range of from 350 to 600° C., more preferably in the range of from 400 to 550° C., wherein the gas atmosphere preferably comprises oxygen.
52. The process of embodiment 50 or 51, wherein the metal M is a transition metal of groups 7 to 12 of the periodic system of elements.
53. The process of embodiment 52, wherein the metal M is one or more of Fe, Co, Ni, Cu, and Zn, preferably one or more of Fe and Cu.
54. The process of embodiment 53, wherein the metal M comprises, preferably is Cu.
55. The process of any one of embodiments 50 to 54, wherein according to (viii), the metal M is supported on the zeolitic material in an amount in the range of from 1 to 9 weight-%, preferably in the range of from 1.5 to 8 weight-%, more preferably in the range of from 2 to 7 weight-%, more preferably in the range of from 2.5 to 6 weight-%, more preferably in the range of from 3 to 5 weight-%, calculated as MO and based on the total weight of the zeolitic material.
56. The process of any one of embodiments 50 to 54, wherein according to (viii), the metal M is supported on the zeolitic material in an amount in the range of from 1 to 11 weight-%, preferably in the range of from 2 to 10 weight-%, more preferably in the range of from 3 to 9 weight-%, more preferably in the range of from 4 to 8 weight-%, more preferably in the range of from 5 to 7 weight-%, calculated as MO and based on the total weight of the zeolitic material.
57. A zeolitic material having framework type AEI and having a framework structure which comprises a tetravalent element Y, a trivalent element X, and O, obtainable or obtained or preparable or prepared by a process according to any one of embodiments 1 to 49.
58. A zeolitic material comprising a metal M, having framework type AEI and having a framework structure which comprises a tetravalent element Y, a trivalent element X, and O, obtainable or obtained or preparable or prepared by a process according to any one of embodiments 50 to 56.
59. A zeolitic material having framework type AEI, preferably the zeolitic material according to embodiment 57 or 58, more preferably 58, having a framework structure which comprises a tetravalent element Y, a trivalent element X, and O, exhibiting a $^{27}$Al solid-state NMR spectrum determined as described in Reference Example 1.6, comprising resonances and a peak maximum in the range of from 62.0 to 54.0 ppm, preferably in the range of from 59.0 to 57.0 ppm, more preferably in the range of from 58.5 to 57.5 ppm, preferably comprising a full width at half height in the range of from 6.2 to 8.2 ppm, preferably in the range of from 6.5 to 7.9 ppm, more preferably in the range of from 6.9 to 7.5 ppm;
wherein Y is one or more of Si, Ge, S, Ti, and Zr; and
wherein X is one or more of Al, B, Ga, and In;
wherein Y preferably comprises, more preferably is Si;
wherein X preferably comprises, more preferably is Al.

60. The zeolitic material of embodiment 59, exhibiting a $^{27}$Al solid-state NMR spectrum determined as described in Reference Example 1.6, comprising a ratio of the integral from 81 to 35 ppm to the integral from 35 to −10 ppm of at least 95:5, preferably of at least 98:2, more preferably of at least 99:1.

61. The zeolitic material of embodiment 59 or 60, exhibiting a $^{29}$Si solid-state NMR spectrum determined as described in Reference Example 1.7, comprising resonances and a peak maximum in the range of from −108.0 to −113.0 ppm, preferably in the range of from −109.5 to −111.5 ppm, more preferably in the range of from −110.1 to −110.9 ppm.

62. The zeolitic material of embodiment 61, exhibiting a $^{29}$Si solid-state NMR spectrum determined as described in Reference Example 1.7, additionally comprising resonances and a peak maximum in the range of from −102.0 to −107.0 ppm, preferably in the range of from −103.5 to −105.5 ppm, more preferably in the range of from −104.1 to −104.9 ppm.

63. The zeolitic material of embodiment 61 or 62, exhibiting a $^{29}$Si solid-state NMR spectrum determined as described in Reference Example 1.7, additionally comprising resonances and a peak maximum in the range of from −96.0 ppm to −101.0 ppm, preferably in the range of from −97.5 to −99.5 ppm, more preferably in the range of from −98.1 to −98.9 ppm.

64. The zeolitic material of any one of embodiments 61 to 63, exhibiting a $^{29}$Si solid-state NMR spectrum determined as described in Reference Example 1.7, comprising three integrals from −94.7 to −101.1 ppm and from −101.1 to −107.7 and −107.7 to −115.7, with their total sum normalized to 100 being 25 (+/−7): 50 (+/−7): 25 (+/−7), preferably 25 (+/−4): 50 (+/−4): 25 (+/−4), more preferably 25 (+/−2): 50 (+/−2): 25 (+/−2).

65. Use of a zeolitic material according to any one of embodiments 57 to 64 as a catalytically active material, as a catalyst, or as a catalyst component.

66. The use of embodiment 65 for the selective catalytic reduction of nitrogen oxides in an exhaust gas stream, preferably an exhaust gas stream from a diesel engine.

67. The use of embodiment 65 for the conversion of a C1 compound to one or more olefins, preferably for the conversion of methanol to one or more olefins or the conversion of a synthetic gas comprising carbon monoxide and hydrogen to one or more olefins.

68. A method for selectively catalytically reducing nitrogen oxides in an exhaust gas stream, preferably an exhaust gas stream from a diesel engine, said method comprising bringing said exhaust gas stream in contact with a catalyst comprising the zeolitic material according to any one of embodiments 57 to 64.

69. A method for selectively catalytically reducing nitrogen oxides in an exhaust gas stream, preferably an exhaust gas stream from a diesel engine, said method comprising preparing a zeolitic material having framework type AEI and having a framework structure which comprises a tetravalent element Y, a trivalent element X, and O by a process according to any one of embodiments 1 to 56, preferably 50 to 56, and bringing said exhaust gas stream in contact with a catalyst comprising said zeolitic material.

70. A method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the zeolitic material according to any one of embodiments 57 to 64.

71. A method for catalytically converting a C1 compound to one or more olefins, preferably converting methanol to one or more olefins or converting a synthetic gas comprising carbon monoxide and hydrogen to one or more olefins, said method comprising preparing a zeolitic material having framework type AEI and having a framework structure which comprises a tetravalent element Y, a trivalent element X, and O by a process according to any one of embodiments 1 to 56, preferably 50 to 56, and bringing said C1 compound in contact with a catalyst comprising said zeolitic material.

72. A catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the zeolitic material according to any one of embodiments 57 to 64.

The present invention is further illustrated by the following set of embodiments and combinations of embodiments resulting from the dependencies and back-references as indicated. In particular, it is noted that in each instance where a range of embodiments is mentioned, for example in the context of a term such as "The process of any one of embodiments 1 to 4", every embodiment in this range is meant to be explicitly disclosed for the skilled person, i.e. the wording of this term is to be understood by the skilled person as being synonymous to "The process of any one of embodiments 1, 2, 3, and 4".

1. A process for preparing a solid oxidic composition comprising a zeolitic material having framework type AEI and a framework structure comprising a tetravalent element Y, a trivalent element X, and O, the process comprising
   (i) preparing a synthesis mixture comprising water, a source of Y, a source of X, an AEI framework structure directing agent, and a source of sodium, wherein one or more of the source of Y and the source of X comprise sodium;
   (ii) heating the synthesis mixture obtained from (i) to a temperature in the range of from 100 to 180° C. and keeping the synthesis mixture under autogenous pressure at a temperature in this range for a time in the range of at least 6 h, obtaining a mixture comprising the zeolitic material having framework type AEI and a framework structure comprising a tetravalent element Y, a trivalent element X, and O, comprised in its mother liquor;

wherein in the synthesis mixture prepared in (i) and subjected to (ii), at least 50 weight-% of the source of sodium, calculated as elemental sodium, consist of one or more of the source of Y and the source of X comprising sodium;
wherein Y is one or more of Si, Ge, S, Ti, and Zr; and wherein X is one or more of Al, B, Ga, and In.

2. The process of embodiment 1, wherein in the synthesis mixture prepared in (i) which is subjected to (ii), at least 75 weight-%, preferably at least 90 weight-%, more preferably at least 95 weight-% of the source of sodium, calculated as elemental sodium, consist of one or more of the source of Y and the source of X comprising sodium.

3. The process of embodiment 1 or 2, wherein in the synthesis mixture prepared in (i) which is subjected to (ii), at least 99 weight-%, preferably at least 99.5 weight-%, more preferably at least 99.9 weight-% of the source of sodium, calculated as elemental sodium, consist of one or more of the source of Y and the source of X comprising sodium.

4. The process of any one of embodiments 1 to 3, wherein in the synthesis mixture prepared in (i) which is subjected to (ii), the source of sodium consists of one or more of the source of Y and the source of X comprising sodium.

5. The process of any one of embodiments 1 to 4, wherein Y comprises, preferably is Si.

6. The process of any one of embodiments 1 to 5, wherein X comprises, preferably is Al.

7. The process of any one of embodiments 1 to 6, wherein Y is Si and X is Al.

8. The process of any one of embodiments 1 to 7, wherein the source of Y comprises a sodium silicate $(Na_2SiO_2)_nO$ wherein n is an integer preferably in the range of from 1 to 5, more preferably in the range of from 1 to 3, more preferably 1 or 2.

9. The process of any one of embodiments 1 to 8, wherein the source of Y comprises $Na_2SiO_3$.

10. The process of any one of embodiments 1 to 9, wherein the source of Y is $Na_2SiO_3$.

11. The process of any one of embodiments 1 to 10, wherein the source of Y comprises one or more of a wet-process silica, a dry-process silica, and a colloidal silica.

12. The process of embodiment 11, wherein the source of Y comprises a colloidal silica.

13. The process of embodiment 11 or 12, wherein the source of Y comprises, preferably is, $Na_2SiO_3$ and a colloidal silica.

14. The process of any one of embodiments 1 to 9, wherein the source of Y does not comprise one or more of a wet-process silica, a dry-process silica, and a colloidal silica, preferably wherein the source of Y does not comprise a colloidal silica.

15. The process of any one of embodiments 1 to 14, wherein the source of X comprises a sodium aluminate, preferably one or more $NaAlO_2$, $NaAl(OH)_4$, $Na_2O \cdot Al_2O_3$, $Na_2Al_2O_4$, $Na_5AlO_4$, $Na_7Al_3O_8$, $Na_{17}Al_5O_{16}$, and $NaAl_{11}O_{17}$.

16. The process of any one of embodiments 1 to 15, wherein the source of X comprises $NaAlO_2$.

17. The process of any one of embodiments 1 to 16, wherein the source of X is $NaAlO_2$.

18. The process of any one of embodiments 1 to 17, wherein the AEI framework structure directing agent comprises one or more quaternary phosphonium cation containing compounds and/or one or more quaternary ammonium cation containing compounds; wherein the one or more phosphonium cation containing compounds comprise one or more $R^1R^2R^3R^4P^+$-containing compounds, wherein $R^1$, $R^2$, $R^3$, and $R^4$ independently from one another stand for optionally substituted and/or optionally branched $(C_1-C_6)$alkyl, preferably $(C_1-C_5)$ alkyl, more preferably $(C_1-C_4)$alkyl, more preferably $(C_2-C_3)$alkyl, and even more preferably for optionally substituted methyl or ethyl, wherein even more preferably $R^1$, $R^2$, $R^3$, and $R^4$ stand for optionally substituted ethyl, preferably unsubstituted ethyl; wherein the one or more quaternary ammonium cation containing compounds comprise one or more N,N-dialkyl-dialkylpiperidinium cation containing compounds, preferably one or more N,N—$(C_1-C_3)$dialkyl-$(C_1-C_3)$dialkylpiperidinium cation containing compounds, more preferably one or more N,N—$(C_1-C_2)$dialkyl-$(C_1-C_2)$ dialkylpiperidinium cation containing compounds, wherein more preferably, the one or more quaternary ammonium cation containing compounds are selected from the group consisting of N,N—$(C_1-C_2)$dialkyl-2,6-$(C_1-C_2)$dialkylpiperidinium cation and N,N—$(C_1-C_2)$dialkyl-3,5-$(C_1-C_2)$di-alkylpiperidinium cation containing compounds, more preferably from the group consisting of N,N-dimethyl-2,6-$(C_1-C_2)$dialkylpiperidinium cation and N,N-dimethyl-3,5-$(C_1-C_2)$dialkyl-piperidinium cation containing compounds, more preferably from the group consisting of N,N-dimethyl-2,6-dimethylpiperidinium cation and N,N-dimethyl-3,5-dimethyl-piperidinium cation containing compounds;
wherein the one or more quaternary phosphonium cation containing compounds and/or the one or more quaternary ammonium cation containing compounds are salts, preferably selected from the group consisting of halides, preferably chloride and/or bromide, more preferably chloride; hydroxide; sulfate; nitrate; phosphate; acetate; and mixtures of two or more thereof, more preferably from the group consisting of chloride, hydroxide, sulfate, and mixtures of two or more thereof, wherein more preferably the one or more quaternary phosphonium cation containing compounds and/or the one or more quaternary ammonium cation containing compounds are hydroxides and/or chlorides, more preferably hydroxides.

19. The process of any one of embodiments 1 to 18, wherein the AEI framework structure directing agent comprises, preferably is N,N-dimethyl-3,5-dimethylpiperidinium hydroxide.

20. The process of any one of embodiments 1 to 19, wherein in the synthesis mixture prepared in (i) which is subjected to (ii), the molar ratio of the source of Y, calculated as $YO_2$, relative to the source of X, calculated as $X_2O_3$, is in the range of from 5:1 to 25:1, preferably in the range of from 10:1 to 20:1, more preferably in the range of from 13:1 to 17:1.

21. The process of any one of embodiments 1 to 20, wherein in the synthesis mixture prepared in (i) which is subjected to (ii), the molar ratio of the source of Y, calculated as $YO_2$, relative to the AEI framework structure directing agent is in the range of from 1:1 to 10:1, preferably in the range of from 2:1 to 8:1, more preferably in the range of from 3:1 to 5:1.

22. The process of any one of embodiments 1 to 21, wherein in the synthesis mixture prepared in (i) which is subjected to (ii), the molar ratio of the source of Y, calculated as YO$_2$, relative to the water is in the range of from 0.01:1 to 1:1, preferably in the range of from 0.01:1 to 0.5:1, more preferably in the range of from 0.01:1 to 0.1:1.

23. The process of any one of embodiments 1 to 22, wherein at least 95 weight-%, preferably at least 98 weight-%, more preferably at least 99 weight-% of the synthesis mixture prepared in (i) which is subjected to (ii) consist of water, the source of Y, the source of X, the AEI framework structure directing agent, and the source of sodium.

24. The process of any one of embodiments 1 to 23, wherein the synthesis mixture prepared in (i) which is subjected to (ii) further comprises a crystalline seed material comprising a zeolitic material having framework type AEI and a framework structure comprising a tetravalent element Y, a trivalent element X, and O.

25. The process of embodiment 24, wherein in the synthesis mixture prepared in (i) which is subjected to (ii), the ratio of Si, comprised in the zeolitic material having framework type AEI comprised in the crystalline seed material and calculated as elemental Si, relative to Al, comprised in the crystalline seed material and calculated as elemental Al, said ratio being defined as Si:Al, is in the range of from 5:1 to 11:1, preferably in the range of from 6:1 to 10:1, more preferably in the range of from 7:1 to 9:1.

26. The process of embodiment 24, wherein in the synthesis mixture prepared in (i) which is subjected to (ii), the ratio of Si, comprised in the zeolitic material having framework type AEI comprised in the crystalline seed material and calculated as elemental Si, relative to Al, comprised in the crystalline seed material and calculated as elemental Al, said ratio being defined as Si:Al, is in the range of from 6:1 to 12:1, preferably in the range of from 7:1 to 11:1, more preferably in the range of from 8:1 to 10:1.

27. The process of any one of embodiments 24 to 26, wherein in the synthesis mixture prepared in (i) which is subjected to (ii), the molar ratio of the source of Y, calculated as YO$_2$, relative to Y' comprised in the seed material, calculated as YO$_2$, is in the range of from 1:1 to 15:1, preferably in the range of from 1:1 to 10:1, more preferably in the range of from 1.1 to 5:1.

28. The process of any one of embodiments 24 to 27, wherein in the synthesis mixture prepared in (i) which is subjected to (ii), the molar ratio of the source of Y, calculated as YO$_2$, relative to Y comprised in the seed material, calculated as YO$_2$, is in the range of from 1:1 to 1:1.5, preferably in the range of from 1:1 to 1:1.4, more preferably in the range of from 1:1 to 1:1.3.

29. The process of any one of embodiments 24 to 28, wherein at least 95 weight-%, preferably at least 98 weight-%, more preferably at least 99 weight-% of the synthesis mixture prepared in (i) which is subjected to (ii) consist of water, the source of Y, the source of X, the AEI framework structure directing agent, the source of sodium and the crystalline seed material.

30. The process according to any one of embodiments 1 to 29, wherein (ii) is carried out in an autoclave.

31. The process of any one of embodiments 1 to 30, wherein the synthesis mixture prepared in (i) is heated to the temperature in (ii) with a heating rate in the range of from 0.5 to 4 K/min, preferably in the range of from 1 to 3 K/min.

32. The process of any one of embodiments 1 to 31, wherein heating the synthesis mixture obtained from (i) in (ii) is carried out at a temperature in the range of from 140 to 160° C., preferably in the range of from 150 to 170° C.

33. The process of any one of embodiments 1 to 31, wherein heating the synthesis mixture obtained from (i) in (ii) is carried out at a temperature in the range of from 100 to 140° C., preferably in the range of from 110 to 130° C.

34. The process of any one of embodiments 1 to 33, wherein heating the synthesis mixture obtained from (i) in (ii) comprises agitating, preferably mechanically agitating, more preferably stirring the synthesis mixture.

35. The process of any one of embodiments 1 to 34, wherein heating the synthesis mixture obtained from (i) in (ii) is carried out for a time in the range of from 8 to 144 h, preferably in the range of from 12 to 120 h, more preferably in the range of from 24 to 72 h.

36. The process of any one of embodiments 1 to 34, wherein heating the synthesis mixture obtained from (i) in (ii) is carried out for a time in the range of from 24 h to 216 h, preferably in the range of from 48 to 192 h, more preferably in the range of from 72 to 168 h, more preferably in the range of from 96 to 144 h.

37. The process of any one of embodiments 1 to 36, further comprising
  (iii) cooling the mixture obtained from (ii), preferably to a temperature in the range of from 10 to 50° C., more preferably in the range of from 20 to 35° C.;
  (iv) separating a solid oxidic composition comprising a zeolitic material having framework type AEI and a framework structure which comprises a tetravalent element Y, a trivalent element X, and O, from the mixture obtained from (ii), said separating preferably comprising
    (iv.1) subjecting the mixture obtained from (ii) to a solid-liquid separation method, preferably comprising a filtration method or a spraying method obtaining a solid oxidic composition comprising a zeolitic material having framework type AEI and a framework structure which comprises a tetravalent element Y, a trivalent element X, and O;
    (iv.2) preferably washing the solid oxidic composition, obtained from (iv.1);
    (iv.3) preferably drying the solid oxidic composition obtained from (iv.1) or from (iv.2), preferably from (iv.2), in a gas atmosphere having a temperature in the range of from 80 to 170° C., preferably in the range of from 100 to 140° C., more preferably in the range of from 100 to 130° C.;
  (v) preferably calcining the solid oxidic composition, obtained from (iv) in a gas atmosphere having a temperature in the range of from 400 to 600° C.;

38. The process of embodiment 37, wherein the gas atmosphere in (iv.3) comprises oxygen, preferably is air, lean air, or synthetic air, and wherein the gas atmosphere in (v) comprises oxygen, preferably is air, lean air, or synthetic air.

39. The process of any one of embodiments 1 to 38, preferably according to embodiment 37 or 38, wherein the solid acidic composition comprising a zeolitic material obtained having framework type AEI and a framework structure comprising a tetravalent element Y, a trivalent element X, and O exhibits one or more of the following characteristics (1) to (3), preferably two or more of the following characteristics (1) to (3), more preferably the following characteristics (1) to (3):
  (1) a BET specific surface area in the range of from 200 to 340 m$^2$/g, preferably in the range of from 220 to 320 m$^2$/g, more preferably in the range of from 240 to 300 m$^2$/g, more preferably in the range of from 260 to 280 m$^2$/g, determined as described in Reference Example 1.2 herein;
  (2) a crystallinity of at least 60%, preferably at least 70%, more preferably at least 80%, more preferably at least 90%, wherein the crystallinity is determined as described in Reference Example 1.1 herein;
  (3) a Langmuir surface area in the range of from 290 to 430 m$^2$/g, preferably in the range of from 310 to 410 m$^2$/g, more preferably in the range of from 330 to 390 m$^2$/g, more preferably in the range of from 350 to 370 m$^2$/g, determined according to DIN 66131.
40. The process of any one of embodiments 37 to 39, further comprising
  (vi) subjecting the solid oxidic composition, obtained from (iv) or (v), preferably from (v), to ion exchange conditions, comprising bringing a solution comprising ammonium ions in contact with the solid oxidic composition, obtained from (iv) or (v), preferably from (v), obtaining a solid oxidic composition comprising a zeolitic material having framework type AEI in its ammonium form.
41. The process of embodiment 40, wherein the solution comprising ammonium ions according to (vi) is an aqueous solution comprising a dissolved ammonium salt, preferably a dissolved inorganic ammonium salt, more preferably dissolved ammonium nitrate.
42. The process of embodiment 40 or 41, wherein the solution comprising ammonium ions according to (vi) has an ammonium concentration in the range of from 1 to 5 mol/l, preferably in the range of from 1.5 to 4 mol/l, more preferably in the range of from 2 to 3 mol/l.
43. The process of any one of embodiments 40 to 42, wherein according to (vi), the solution comprising ammonium ions is brought in contact with the solid oxidic composition, obtained from (iv) or (v), preferably from (v), at a temperature of the solution in the range of from 50 to 95° C., preferably in the range of from 60 to 90° C., more preferably in the range of from 70 to 85° C.
44. The process of embodiment 43, wherein the solution comprising ammonium ions is brought in contact with the solid oxidic composition, from (iv) or (v), preferably from (v), for a period of time in the range of from 1 to 5 hours, preferably from 2 to 4 hours, more preferably in the range of from 2.5 to 3.5 h.
45. The process of any one of embodiments 40 to 44, wherein bringing the solution in contact with the solid oxidic composition according to (vi) is repeated at least once, preferably once or twice, more preferably once.
46. The process of any one of embodiments 40 to 45, wherein bringing the solution in contact with the solid oxidic composition, according to (vi) comprises one or more of impregnating the solid oxidic composition with the solution and spraying the solution onto the solid oxidic composition, preferably impregnating the solid oxidic composition with the solution.
47. The process of any one of embodiments 40 to 46, further comprising
  (vii) calcining the solid oxidic composition obtained from (vi), obtaining the H-form of the zeolitic material.
48. The process of any one of embodiments 1 to 47, wherein more than 50 weight-%, preferably at least 55 weight-%, more preferably at least 60 weight-%, more preferably at least 70 weight-%, more preferably at least 80 weight-% of the solid oxidic composition comprising a zeolitic material having framework type AEI and having a framework structure comprising a tetravalent element Y, a trivalent element X, and O, consist of the zeolitic material having framework type AEI and having a framework structure comprising a tetravalent element Y, a trivalent element X, and O, preferably determined as described in Reference Example 1.1 herein.
49. The process of embodiment 48, wherein the solid oxidic composition comprises the zeolitic material having framework type AEI and having a framework structure comprising a tetravalent element Y, a trivalent element X, and O, and further comprises one or more zeolitic materials having a framework type other than AEI.
50. The process of embodiment 49, wherein the solid oxidic composition comprises, preferably consists of a zeolitic material having framework type AEI and a zeolitic material having framework type AFI.
51. The process of embodiment 49, wherein the solid oxidic composition comprises, preferably consists of a zeolitic material having framework type AEI and a zeolitic material having framework type GME.
52. The process of any one of embodiments 47 to 51, wherein according to (vii), the solid oxidic composition is calcined in a gas atmosphere having a temperature in the range of from 300 to 700° C., preferably in the range of from 350 to 600° C., more preferably in the range of from 400 to 600° C., more preferably in the range of from 450 to 550° C.
53. The process of embodiment 52, wherein the gas atmosphere comprises oxygen, preferably is air, lean air, or synthetic air.
54. The process of any one of embodiments 1 to 53, preferably any one of embodiments 37 to 53, more preferably any one of embodiments 40 to 46, further comprising
  (viii) supporting a metal M on the solid oxidic composition comprising a zeolitic material having framework type AEI and a framework structure comprising a tetravalent element Y, a trivalent element X, and O, preferably on the solid oxidic composition comprising a zeolitic material having framework type AEI and a framework structure comprising a tetravalent element Y, a trivalent element X, and O, obtained from (iv) or (v).
55. The process of embodiment 54, wherein (viii) comprises
  (viii.1) preparing a mixture comprising the solid oxidic composition comprising a zeolitic material having framework type AEI and a framework structure comprising a tetravalent element Y, a trivalent element X, and O, preferably the solid oxidic composition comprising a zeolitic material having framework type AEI and a framework structure comprising a tetravalent element Y, a trivalent element X, and O, obtained from (iv) or (v), a source of a metal M, a solvent for the source of the metal M, and optionally an acid, preferably an organic acid, wherein the solvent preferably comprises water, the source of the metal M preferably comprises a salt of the metal M and the acid preferably comprises acetic acid;

(viii.2) heating the mixture prepared in (viii.1) to a temperature in the range of from 30 to 90° C., preferably in the range of from 40 to 80° C.;

(viii.3) preferably cooling, more preferably rapid-cooling the mixture obtained from (viii.2);

(viii.4) separating the solid oxidic composition comprising the metal M from the mixture obtained from (viii.2) or (viii.3), preferably from (viii.3), the separating preferably comprising washing the solid oxidic composition comprising the metal M;

(viii.5) preferably drying the solid oxidic composition comprising the metal M obtained from (viii.4) in a gas atmosphere, preferably at a temperature of the gas atmosphere in the range of from 90 to 200° C., more preferably in the range of from 100 to 150° C., wherein the gas atmosphere preferably comprises oxygen;

(viii.6) preferably calcining the solid oxidic composition comprising the metal M obtained from (viii.4) or (viii.5), preferably (viii.5), in a gas atmosphere, preferably at a temperature of the gas atmosphere in the range of from 350 to 600° C., more preferably in the range of from 400 to 550° C., wherein the gas atmosphere preferably comprises oxygen.

56. The process of embodiment 54 or 55, wherein the metal M is a transition metal of groups 7 to 12 of the periodic system of elements.

57. The process of embodiment 56, wherein the metal M is one or more of Fe, Co, Ni, Cu, and Zn, preferably one or more of Fe and Cu.

58. The process of embodiment 57, wherein the metal M comprises, preferably is Cu.

59. The process of any one of embodiments 54 to 58, wherein according to (viii), the metal M is supported on the solid oxidic composition in an amount in the range of from 1 to 9 weight-%, preferably in the range of from 1.5 to 8 weight-%, more preferably in the range of from 2 to 7 weight-%, more preferably in the range of from 2.5 to 6 weight-%, more preferably in the range of from 3 to 5 weight-%, calculated as MO and based on the total weight of the solid oxidic composition.

60. The process of any one of embodiments 54 to 58, wherein according to (viii), the metal M is supported on the solid oxidic composition in an amount in the range of from 1 to 11 weight-%, preferably in the range of from 2 to 10 weight-%, more preferably in the range of from 3 to 9 weight-%, more preferably in the range of from 4 to 8 weight-%, more preferably in the range of from 5 to 7 weight-%, calculated as MO and based on the total weight of the solid oxidic composition.

61. A solid oxidic composition comprising a zeolitic material having framework type AEI and having a framework structure which comprises a tetravalent element Y, a trivalent element X, and O, obtainable or obtained or preparable or prepared by a process according to any one of embodiments 1 to 53, preferably according to any one of embodiments 50 to 53.

62. A solid oxidic composition comprising a zeolitic material comprising a metal M, having framework type AEI and having a framework structure which comprises a tetravalent element Y, a trivalent element X, and O, obtainable or obtained or preparable or prepared by a process according to any one of embodiments 54 to 60.

63. A solid oxidic composition comprising a zeolitic material having framework type AEI, preferably the solid oxidic composition comprising a zeolitic material according to embodiment 61 or 62, more preferably 62, having a framework structure which comprises a tetravalent element Y, a trivalent element X, and O, exhibiting a $^{27}Al$ solid-state NMR spectrum determined as described in Reference Example 1.6, comprising resonances and a peak maximum in the range of from 62.0 to 54.0 ppm, preferably in the range of from 59.0 to 57.0 ppm, more preferably in the range of from 58.5 to 57.5 ppm, preferably comprising a full width at half height in the range of from 6.2 to 8.2 ppm, preferably in the range of from 6.5 to 7.9 ppm, more preferably in the range of from 6.9 to 7.5 ppm;
wherein Y is one or more of Si, Ge, S, Ti, and Zr; and
wherein X is one or more of Al, B, Ga, and In;
wherein Y preferably comprises, more preferably is Si;
wherein X preferably comprises, more preferably is Al.

64. The solid oxidic composition comprising a zeolitic material of embodiment 63, exhibiting a $^{27}Al$ solid-state NMR spectrum determined as described in Reference Example 1.6, comprising a ratio of the integral from 81 to 35 ppm to the integral from 35 to −10 ppm of at least 95:5, preferably of at least 98:2, more preferably of at least 99:1.

65. The solid oxidic composition comprising a zeolitic material of embodiment 63 or 64, exhibiting a $^{29}Si$ solid-state NMR spectrum determined as described in Reference Example 1.7, comprising resonances and a peak maximum in the range of from −108.0 to −113.0 ppm, preferably in the range of from −109.5 to −111.5 ppm, more preferably in the range of from −110.1 to −110.9 ppm.

66. The solid oxidic composition comprising a zeolitic material of embodiment 65, exhibiting a $^{29}Si$ solid-state NMR spectrum determined as described in Reference Example 1.7, additionally comprising resonances and a peak maximum in the range of from −102.0 to −107.0 ppm, preferably in the range of from −103.5 to −105.5 ppm, more preferably in the range of from −104.1 to −104.9 ppm.

67. The solid oxidic composition comprising a zeolitic material of embodiment 65 or 66, exhibiting a $^{29}Si$ solid-state NMR spectrum determined as described in Reference Example 1.7, additionally comprising resonances and a peak maximum in the range of from −96.0 ppm to −101.0 ppm, preferably in the range of from −97.5 to −99.5 ppm, more preferably in the range of from −98.1 to −98.9 ppm.

68. The solid oxidic composition comprising a zeolitic material of any one of embodiments 65 to 67, exhibiting a $^{29}Si$ solid-state NMR spectrum determined as described in Reference Example 1.7, comprising three integrals from −94.7 to −101.1 ppm and from −101.1 to −107.7 and from −107.7 to −115.7, with their total sum normalized to 100 being 25 (+/−7): 50 (+/−7): 25 (+/−7), preferably 25 (+/−4): 50 (+/−4): 25 (+/−4), more preferably 25 (+/−2): 50 (+/−2): 25 (+/−2).

69. Use of a solid oxidic composition according to any one of embodiments 61 to 68 as a catalytically active material, as a catalyst, or as a catalyst component.

70. The use of embodiment 69 for the selective catalytic reduction of nitrogen oxides in an exhaust gas stream, preferably an exhaust gas stream from a diesel engine.

71. The use of embodiment 69 for the conversion of a C1 compound to one or more olefins, preferably for the conversion of methanol to one or more olefins or the conversion of a synthetic gas comprising carbon monoxide and hydrogen to one or more olefins.

72. A method for selectively catalytically reducing nitrogen oxides in an exhaust gas stream, preferably an exhaust gas stream from a diesel engine, said method comprising bringing said exhaust gas stream in contact with a catalyst comprising the solid oxidic composition according to any one of embodiments 61 to 68.
73. A method for selectively catalytically reducing nitrogen oxides in an exhaust gas stream, preferably an exhaust gas stream from a diesel engine, said method comprising preparing a solid oxidic composition comprising a zeolitic material having framework type AEI and having a framework structure which comprises a tetravalent element Y, a trivalent element X, and O by a process according to any one of embodiments 1 to 60, preferably 54 to 60, and bringing said exhaust gas stream in contact with a catalyst comprising said solid oxidic composition.
74. A method for catalytically converting a C1 compound to one or more olefins, preferably converting methanol to one or more olefins or converting a synthetic gas comprising carbon monoxide and hydrogen to one or more olefins, said method comprising bringing said C1 compound in contact with a catalyst comprising the solid oxidic composition according to any one of embodiments 61 to 68.
75. A method for catalytically converting a C1 compound to one or more olefins, preferably converting methanol to one or more olefins or converting a synthetic gas comprising carbon monoxide and hydrogen to one or more olefins, said method comprising preparing a solid oxidic composition comprising a zeolitic material having framework type AEI and having a framework structure which comprises a tetravalent element Y, a trivalent element X, and O by a process according to any one of embodiments 1 to 60, preferably 54 to 60, and bringing said C1 compound in contact with a catalyst comprising said solid oxidic composition.
76. A catalyst, preferably a catalyst for selectively catalytically reducing nitrogen oxides in an exhaust gas stream, preferably an exhaust gas stream from a diesel engine, or for catalytically converting a C1 compound to one or more olefins, preferably converting methanol to one or more olefins or converting a synthetic gas comprising carbon monoxide and hydrogen to one or more olefins, said catalyst comprising the solid oxidic composition according to any one of embodiments 61 to 68.

The present invention is further illustrated by the following examples, comparative examples, and reference examples.

EXAMPLES

Reference Example 1.1: Determination of the Crystallinity

The crystallinity of the zeolitic materials according to the present invention was determined by XRD analysis. The data were collected using a standard Bragg-Brentano diffractometer with a Cu-X-ray source and a linear detector. The angular range of 2° to 70° (2 theta) was scanned with a step size of 0.02°, while the divergence slit was set to a constant opening angle of 0.1°. The quantification of the crystalline content was performed using DIFFRAC.TOPAS V5 soft-ware, based on the crystal structures. This was refined to fit the data. Included in the model were also a linear background, Lorentz and polarization corrections, lattice parameters, space group and crystallite size. The quantification of the amorphous versus crystalline content was performed using DIFFRAC.EVA as described in the user manual.

1. User Manual DIFFRAC.TOPAS V5, 2014, Bruker AXS GmbH, Karlsruhe, Germany
2. User Manual DIFFRAC.EVA, 2014, Bruker AXS GmbH, Karlsruhe, Germany Reference Example 1.2: Determination of the BET Specific Surface Area The BET specific surface area was determined according to ISO 9277, second edition 2010, via nitrogen physisorption at 77 K.

Reference Example 1.3: Determination of the C Value

The C value (BET parameter) was determined as described in ISO 9277, second edition 2010, section 7.2.

Reference Example 1.4: Determination of the XRD Patterns

The XRD diffraction patterns were determined as described in Reference Example 1.1.

Reference Example 1.5: Scanning Electron Microscopy

The SEM (Scanning Electron Microscopy) pictures (secondary electron (SE) picture at 15 kV (kiloVolt)) were made using a Hitachi TM3000.

Reference Example 1.6: $^{27}$Al Solid-State NMR $^{27}$Al solid-state NMR spectra were recorded at 9.4 Tesla under 10 kHz magic-angle spinning using a 15°-single-pulse-acquisition sequence with 0.5 s repetition time and 10240 repetitions, 10 ms acquisition, processed without exponential line broadening, where the pulse angle refers to an external reference sample of Al in aqueous solution. The sample was stored at 62% relative humidity for at least 60h prior to measurement. Resonances were indirectly referenced to $Al(NO_3)_3$ in $D_2O$, 1.1 mol/kg, as zero reference, with a frequency of 0.26056859 on the unified shift scale, in line with IUPAC recommendations 2008 (Pure Appl. Chem., Vol. 80, No. 1, pp. 59-84, 2008), using external secondary standards.

Reference Example 1.7: $^{29}$Si Solid-State NMR $^{29}$Si solid-state NMR spectra were recorded at 9.4 Tesla under 10 kHz magic-angle spinning using a 90°-single-pulse-acquisition sequence with heteronuclear radio-frequency proton-decoupling during acquisition, 120 s repetition time and 160 repetitions, 30 ms acquisition, processed with 30 Hz exponential line broadening. The sample was stored at 62% relative humidity for at least 60 h prior to measurement. Resonances were indirectly referenced to $Me_4Si$ in $CDCl_3$, volume fraction 1%, as zero reference, with a frequency of 0.19867187 on the unified shift scale, in line with IUPAC recommendations 2008 (Pure Appl. Chem., Vol. 80, No. 1, pp. 59-84, 2008), using external secondary standards.

Reference Example 1.8: Elemental Analysis

Elemental analyses were performed on an inductively coupled plasma-atomic emission spectrometer (ICP-AES, Shimadzu ICPE-9000).

Example 1: Preparation of a Zeolitic Material Having Framework Type AEI According to the Invention a) Providing the AEI Seed
Materials Used:
Deionised water 770.71 g
Sodium hydroxide (aqueous solution, 50 weight-%) 70.73 g
1,1,3,5-tetramethylpiperidinium OH (Sachem; aq. mixture, 19.77 weight-%): 196.18 g
Ludox® AS40 (colloidal silica; aqueous solution, 40 weight-%): 219.80 g
$NH_4$-Y-Zeolith (Y-Zeolith seeds, Zeolist) 16.40 g
The NaOH solution was added to a beaker along with 670.71 g water, to which the Y-Zeolith seeds were added along with the template compound (1,1,3,5-tetramethylpiperidinium OH), under stirring at around 23° C. Said mixture was then stirred for one hour, followed by Ludox® AS40 being added over 30 minutes. The thus obtained mixture was then transferred from the beaker to an autoclave and rinsed with 100 g of deionised water. Then, the autoclave was sealed. Within 1 h, the mixture in the autoclave was heated to a temperature of 160° C. and kept at this crystallization temperature for 24 h under stirring. After pressure release and cooling to room temperature, the obtained suspension was subjected to filtration using a nutsch-type filter and the filter cake was thoroughly washed with de-ionized water. The thus washed zeolitic material was dried overnight at 120° C. under air in a convection oven, then calcined at 500° C. for 5 h under air. 32.5 g zeolitic material were obtained.
The crystallinity was 99%, determined as described in Reference Example 1.1. 96% of the crystalline material was zeolitic material having framework type AEI, 4% of the material was zeolitic material having framework type FAU. The elemental Si:Al ratio was 8.6:1, determined as described in Reference Example 1.8.

b) Preparation of a Zeolitic Material Having Framework Type AEI
Materials used:
Sodium Aluminate ($NaAlO_2$; Sigma Aldrich CAS 11138-49-1) 3.7 g
1,1,3,5-tetramethylpiperidinium OH (Sachem; aq. mixture, 19.77 weight-%): 45.7 g
Sodium silicate ($Na_2SiO_3$; Woellner; CAS-Nr. 1344-09-8; 38/40;
ca. 26 weight-% $SiO_2$+8 weight-% $Na_2O$ in water): 60.5 g
Ludox® AS40 (colloidal silica; aqueous solution, 40 weight-%): 18.2 g
AEI Seeds (according to a) above): 1.1 g
The template compound (1,1,3,5-tetramethylpiperidinium hydroxide) was added to a Teflon lined autoclave, followed by adding the sodium aluminate under stirring at around 23° C. The thus obtained mixture was then stirred until the sodium aluminate had dissolved. The following further materials were then added to the autoclave under stirring at around 23° C.: AEI seeds, sodium silicate and the Ludox® AS40. Then, the autoclave was sealed. Within 1 h, the mixture in the autoclave was heated to a temperature of 160° C. and kept at this crystallization temperature for 48 h under stirring. After pressure release and cooling to room temperature, the obtained suspension was subjected to filtration using a nutsch-type filter and the filter cake was washed with de-ionized water until a pH of about 9. The thus washed zeolitic material was dried overnight at 120° C. under air in a convection oven. 11.5 g zeolitic material were obtained, the space-time yield was 57.5 kg/m³/d. The crystallinity was 90%, determined as described in Reference Example 1.1. The XRD pattern, determined as described in Reference Example 1.4, is shown in FIG. 1.
58% of the crystalline material was zeolitic material having framework type AEI, 42% of the material was zeolitic material having framework type AFI.

c) Preparing the Ammonium Form of the Zeolitic Material Having Framework Type AEI Prepared in b)
Ammonium nitrate treatment was carried out as follows: 80 g of distilled water was added to a 150 ml beaker, to which under stirring 8 g of the (Na-AEI) zeolitic material prepared in b) was added, followed by adding 8 g of ammonium nitrate. The beaker was then covered with a watch glass followed by stirring at 80° C. for 1 h. Using a nutsch-type filter, the filter cake was washed nitrate-free with deionized water. Said ammonium nitrate treatment (i) was then repeated once. The resulting filter cake was dried at 120° C. for 5 hours under air.

d) Preparing the H Form of the Zeolitic Material Having Framework Type AEI Prepared in c)
The zeolitic material prepared in c) was calcined at 500° C. for 5 h under air. 6.5 g zeolitic material were obtained.

Example 2: Preparation of a Zeolitic Material Having Framework Type AEI According to the Invention a) Providing the AEI Seed
Materials Used:
Deionised water 708.90 g
Sodium hydroxide (aqueous solution, 50 weight-%) 78.70 g
1,1,3,5-tetramethylpiperidinium OH (Sachem; aq. mixture, 19.77 weight-%): 218.30 g
Ludox® AS40 (colloidal silica; aqueous solution, 40 weight-%): 244.00 g
$NH_4$-Y-Zeolith (Y-Zeolith seeds, Zeolist) 23.48 g
The NaOH solution was added to a beaker along with 608.9 g water, to which the Y-Zeolith seeds were added along with the template compound (1,1,3,5-tetramethylpiperidinium OH), under stirring at around 23° C. Said mixture was then stirred for one hour, followed by Ludox® AS40 being added over 30 minutes. The thus obtained mixture was then transferred from the beaker to an autoclave and rinsed with 100 g of deionised water. Then, the autoclave was sealed. Within 1 h, the mixture in the autoclave was heated to a temperature of 140° C. and kept at this crystallization temperature for 72 h under stirring. After pressure release and cooling to room temperature, the obtained suspension was subjected to filtration using a nutsch-type filter and the filter cake was thoroughly washed with de-ionized water. The thus washed zeolitic material was dried overnight at 120° C. under air in a convection oven, then calcined at 500° C. for 5 h under air. 42.8 g zeolitic material were obtained.
The crystallinity was 95%, determined as described in Reference Example 1.1. 96.5% of the crystalline material was zeolitic material having framework type AEI, 3.5% of the material was zeolitic material having framework type FAU. The elemental Si:Al ratio was 7.6:1, determined as described in Reference Example 1.8.

b) Preparation of a Zeolitic Material Having Framework Type AEI

Materials Used:
Sodium Aluminate (NaAlO$_2$; Sigma Aldrich CAS 11138-49-1) 6.51 g
1,1,3,5-tetramethylpiperidinium OH (Sachem; aq. mixture, 19.77 weight-%): 67.2 g
Sodium silicate (Na$_2$SiO$_3$; Woellner; CAS-Nr. 1344-09-8; 38/40;
ca. 26 weight-% SiO$_2$+8% Na$_2$O in water): 115.8 g
AEI Seeds (according to a) above): 6.1 g Using the materials listed above, the protocol according to Example 1 b) was employed, except for the following differences:

As one can see from the materials used in Example 2, Ludox® AS40 was not employed. Furthermore, in Example 2 the crystallization temperature employed was 120° C. for 5 days. 26.5 g zeolitic material were obtained, the space-time yield was 35.5 kg/m$^3$/d. Elemental analysis of the zeolitic material, in weight-%: Si=29.1; Al=7.3; Na=4.9. The crystallinity was 74%, determined as described in Reference Example 1.1. The BET specific surface area was 266 m$^2$/g, determined as described in Reference Example 1.2. The Langmuir surface area was 357 m$^2$/g determined according to DIN 66131. The C value was −92, determined as described in Reference Example 1.3. The XRD pattern, determined as described in Reference Example 1.4, is shown in FIG. 2. The SEM picture, determined as described in Reference Example 1.5, is shown in FIG. 3.

82% of the crystalline material was zeolitic material having framework type AEI, 18% of the material was zeolitic material having framework type GME. The $^{27}$Al-NMR spectra, determined as described in Reference Example 1.6 is shown in FIG. 5. The $^{29}$Si-NMR spectra, determined as described in Reference Example 1.7 is shown in FIG. 6.

c) Preparing the Ammonium Form of the Zeolitic Material Having Framework Type AEI Prepared in b)

The ammonium form was prepared using the same protocol as employed for Example 1 c).

d) Preparing the H Form of the Zeolitic Material Having Framework Type AEI Prepared in c)

The H form was prepared using the same protocol as employed for Example 1 d).

Example 3: Preparation of Zeolitic Materials Having Framework Type AEI and Comprising a Metal M (Cu)

Cu Doping

Each of the zeolitic materials obtained from Example 1 d) and Example 2 d) were impregnated via incipient wetness with an aqueous copper nitrate solution wherein the amount of Cu nitrate was chosen so that, in the finally obtained material containing Cu supported on the zeolitic material, was 4 weight-% and 6 weight-%, calculated as CuO and based on the total weight of the finally obtained calcined zeolitic material having Cu supported thereon. After the impregnation, the material was stored for 20 h at 50° C., dried, then calcined for 5 h at 450° C. in air.

Shaping Procedure

Based on the above obtained Cu doped powder material, moldings were prepared by mixing the respective powder material with a milled alumina slurry (Puralox® TM 100/150) (weight ratio of zeolitic material:alumina=70:30). Under stirring, the moldings were dried at 100° C., then calcined in air for 1 h at 550° C. The moldings were then crushed and sieved to a particle size of 250-500 micrometer for testing.

For the subsequent tests, respectively fresh and aged Cu containing material was used for the respective Example 3, 1 d) and Example 3, 2 d) materials. For aging, the crushed and sieved particles were subjected for 50 h to air comprising 10 weight-% water at 650° C. in a muffle oven (HDD aging), optionally followed by subjecting for 16 h to air comprising 10 weight-% water at 800° C. in a muffle oven (LDD aging).

Example 4: Use of the Zeolitic Material Having Framework Type AEI for Selectively Catalytically Reducing Nitrogen Oxides The zeolitic materials Example 3, 1 d) and Example 3, 2 d) obtained from Example 3 were subjected to a selective catalytic reduction test. SCR tests were performed on a 48 fold parallel testing unit equipped with ABB LIMAS NO$_x$/NH$_3$ and ABB URAS N$_2$O analyzers (ABB AO2020 series).

For this purpose, the respectively obtained fresh and aged samples (170 mg each) were diluted with 1 mL corundum having the same particle size as the samples were placed in each reactor. Under isothermal conditions (T=175, 200, 250, 300, 450, 550, 575° C.), a given sample was exposed to a feed stream (500 ppm NO, 500 ppm NH$_3$, 10% H$_2$O, 5% O$_2$, balance N$_2$) at a gas hourly space velocity of 80,000 h$^{-1}$ through the catalyst bed. In addition to 30 min waiting time for thermal equilibration of the parallel reactor at each temperature, every position was equilibrated for 3 min followed by 30 sec sampling time. Data recorded by the analyzers at a frequency of 1 Hz was averaged for the sampling interval and used to calculated NO conversions and N$_2$O yield.

The results obtained are shown in FIG. 4.

CITED LITERATURE

Figure 1:
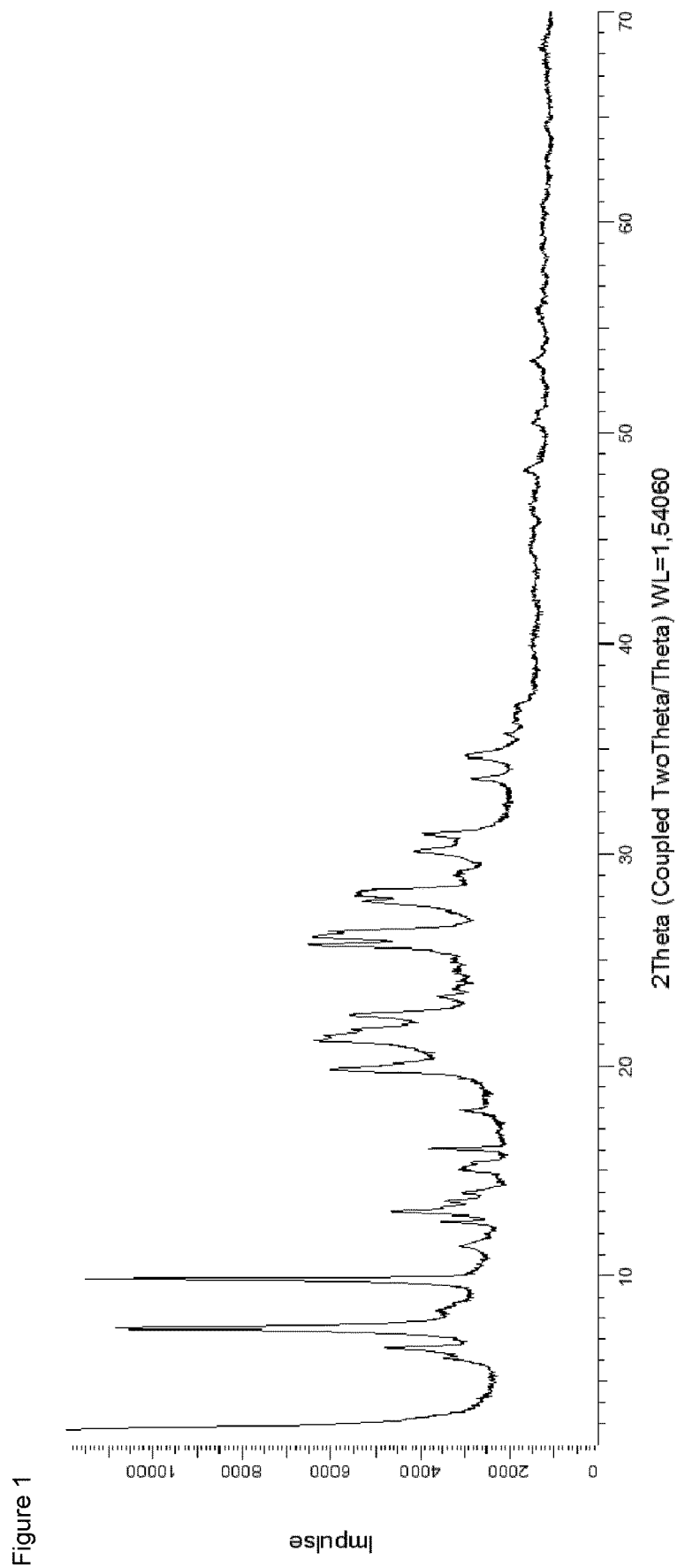
FIG. 1: shows the XRD pattern of the zeolitic material according to Example 1.
Figure 2:
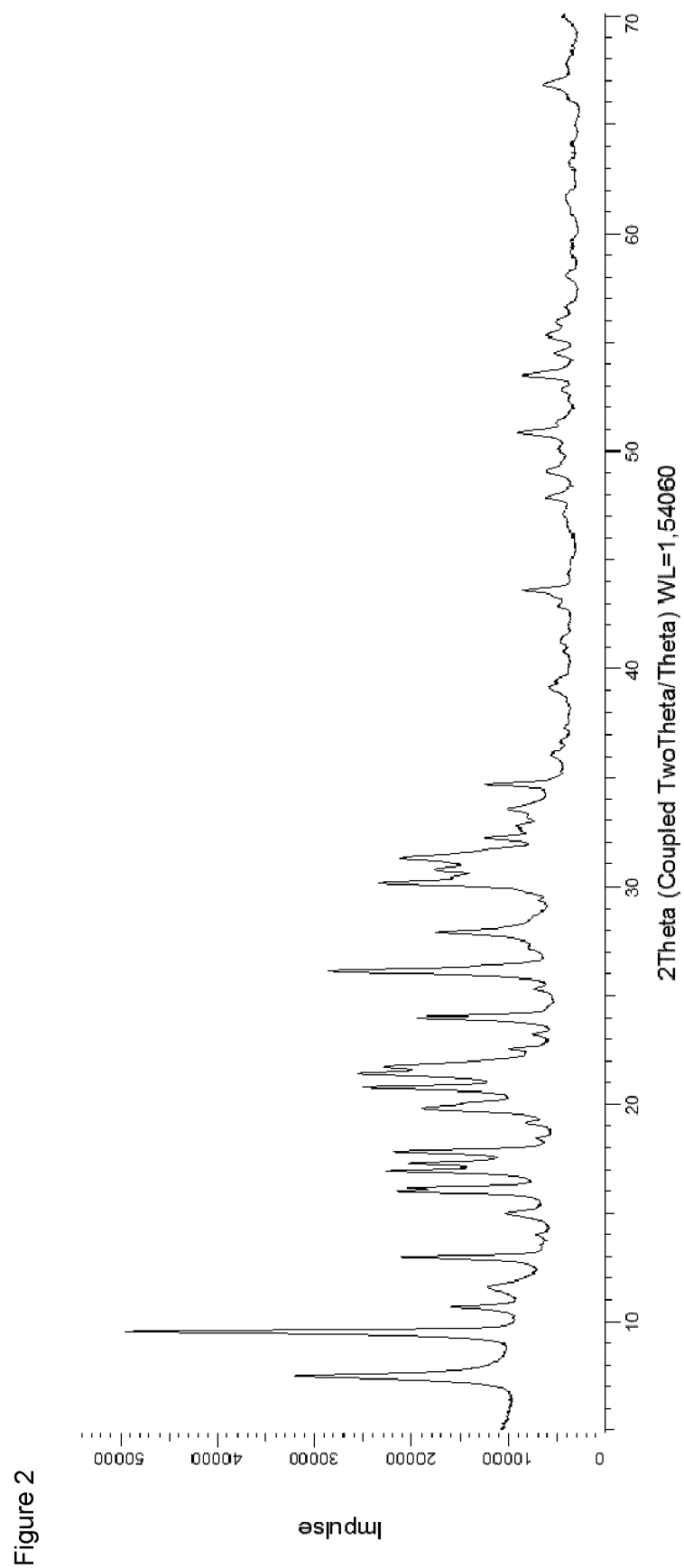
FIG. 2: shows the XRD pattern of the zeolitic material according to Example 2.
Figure 3:
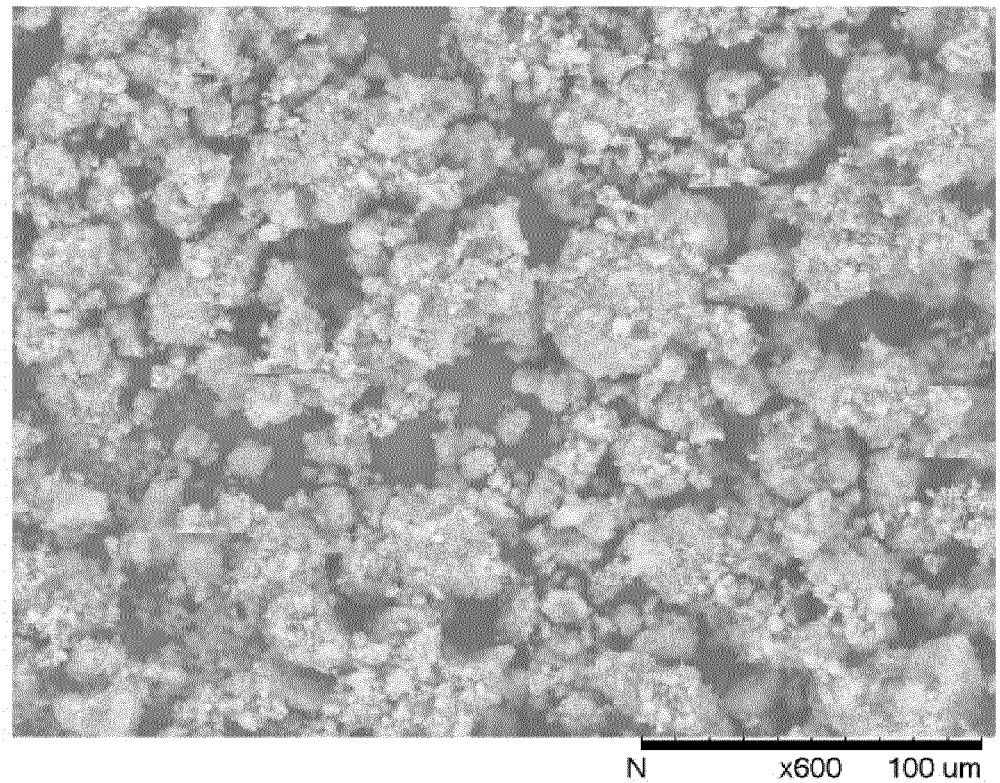
FIG. 3: shows SEM pictures of the zeolitic material according to Example 2.
Figure 3:
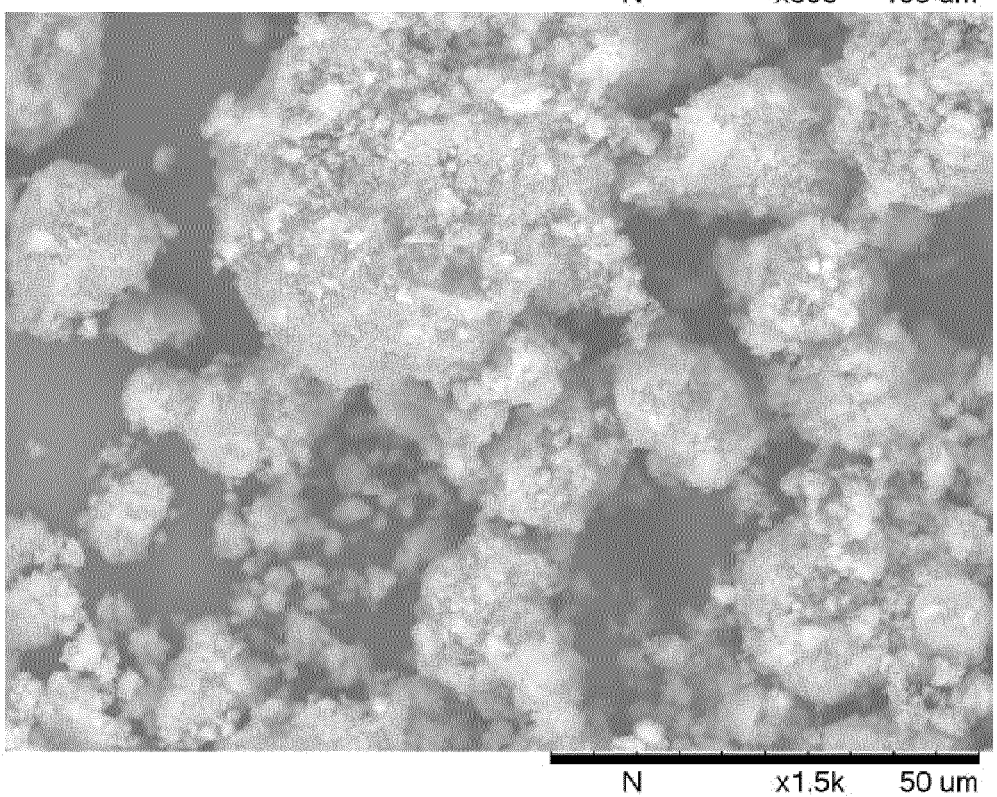
Figure 4:
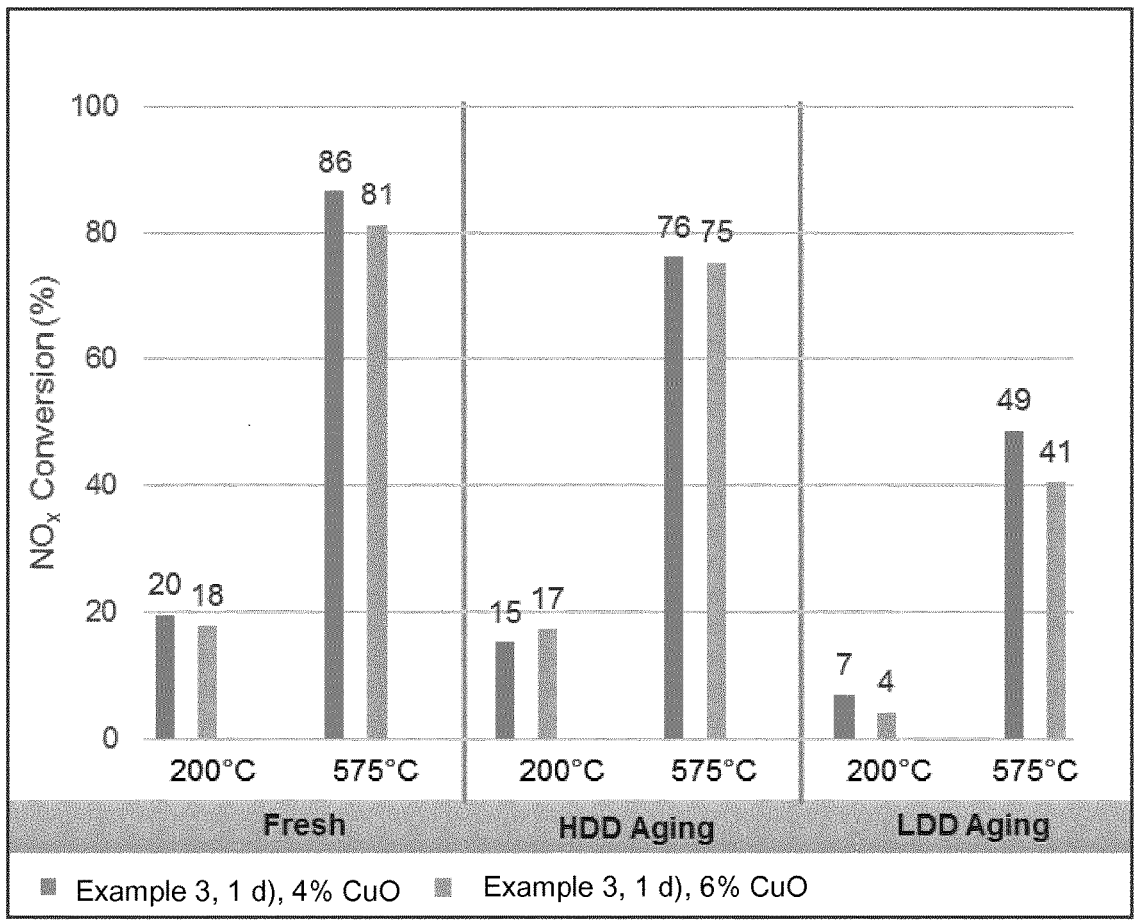
FIG. 4: shows the results obtained from the selective catalytic reduction testing of Example 4. The upper figure shows the results obtained from the Example 3, 1 d) zeolitic material and the lower figure shows the results obtained from the Example 3, 2 d) zeolitic material. In each of the six sets of results, the result on the left corresponds to 4 wt.-% CuO and the result on the right corresponds to 6 wt.-% CuO.
Figure 4:
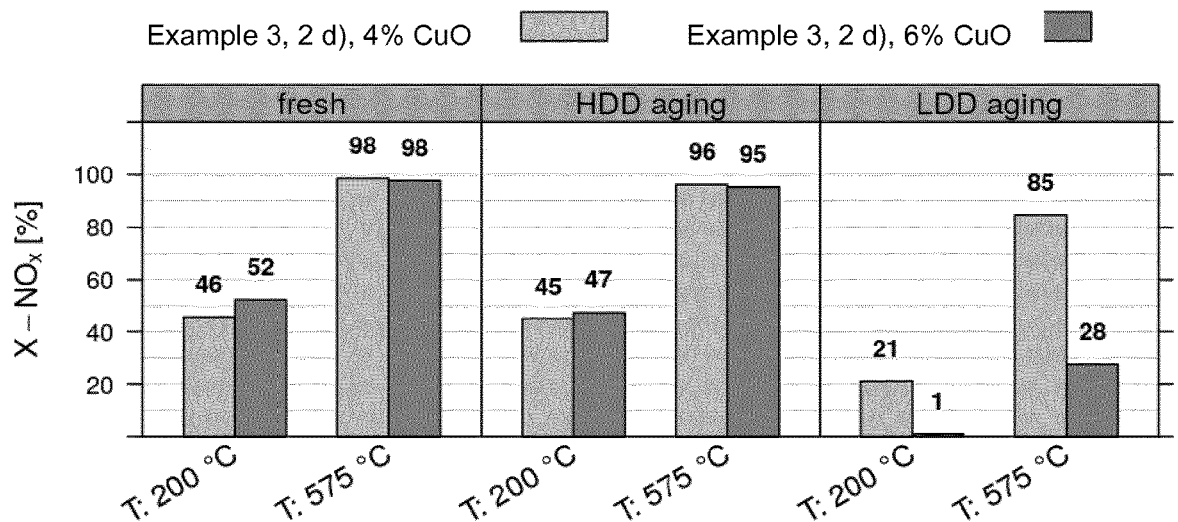
Figure 5:
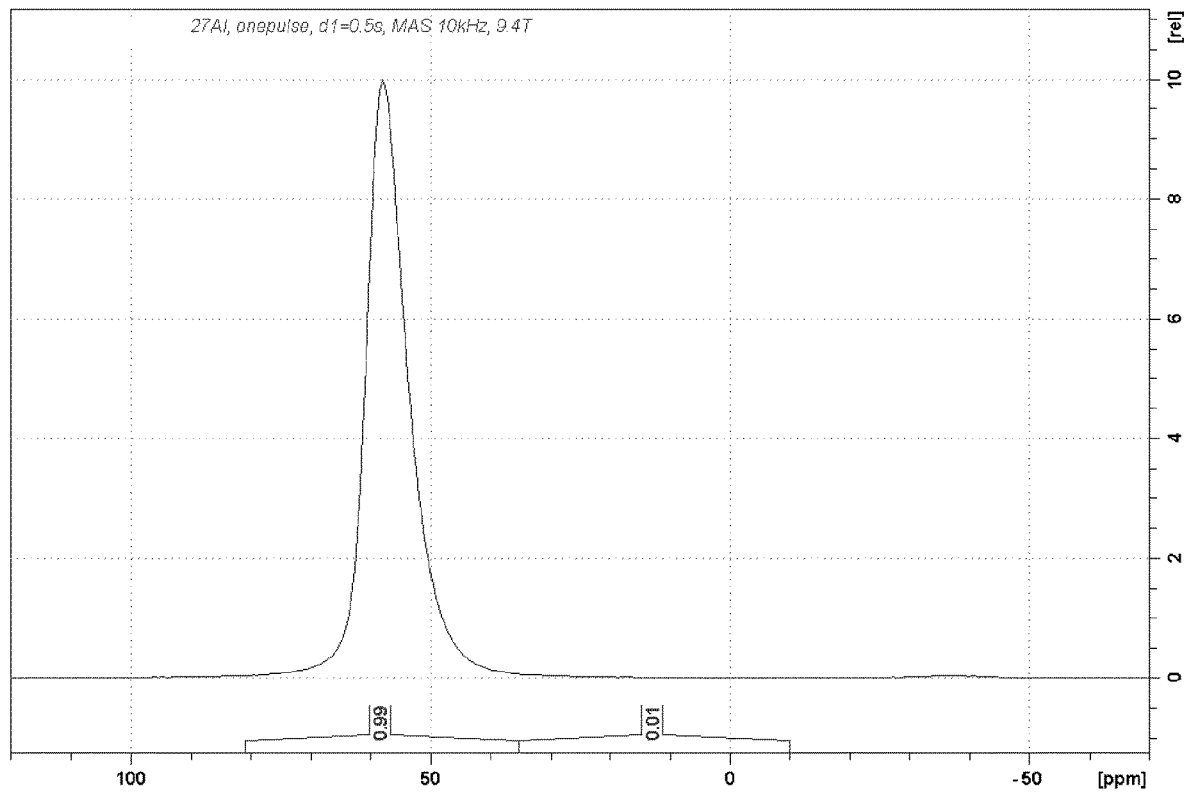
FIG. 5: $^{27}$Al-NMR spectra of the zeolitic material according to Example 2. The spectrum shows a main resonance at 58 ppm with a full width at half height of 7.2 ppm, it has an asymmetric line shape; this resonance can be assigned to tetrahedrally coordinated Al. At the given scale, no distinct resonances at approximately 30 ppm or 0 ppm were observed, which would point to other coordinations. A spinning side band of the main resonance was observed at −38 ppm
Figure 6:
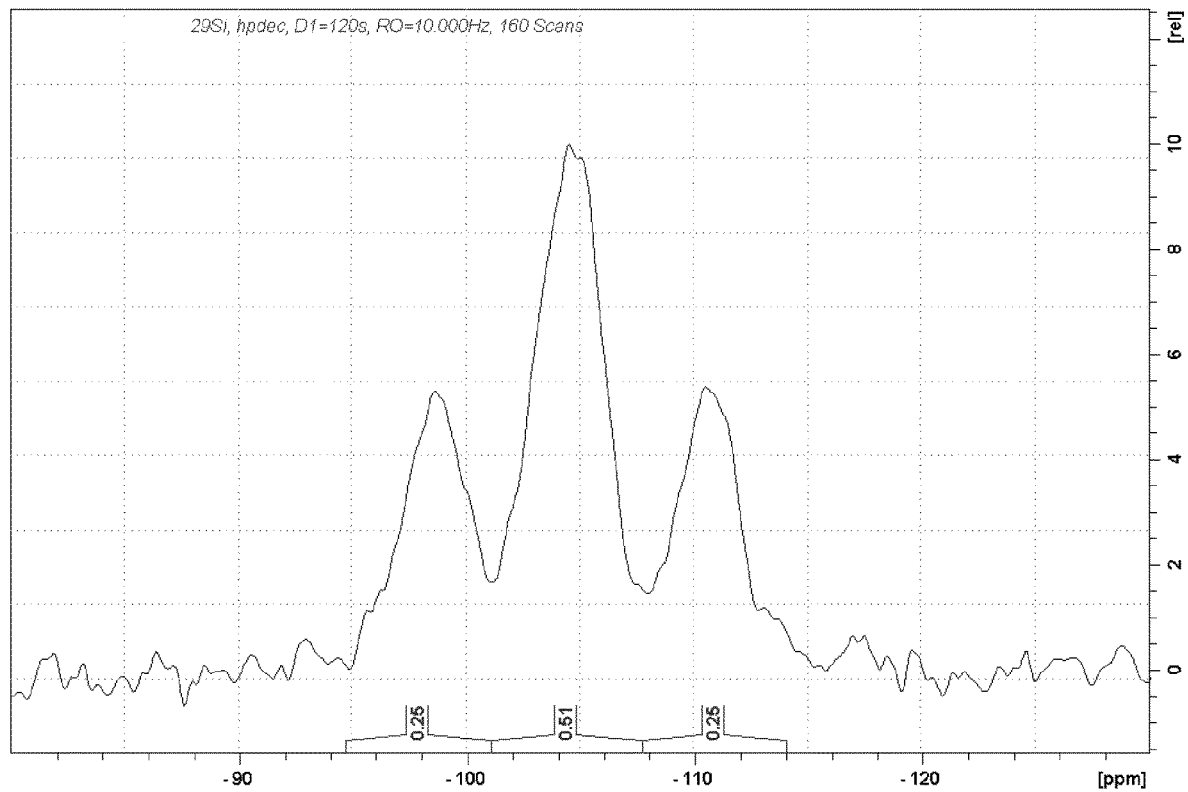
FIG. 6: $^{29}$Si-NMR spectra of the zeolitic material according to Example 2. The spectrum shows a resonance at −111 ppm with a full width at half height of 3.1 ppm, which we assign to Si(4 OSi, 0 OAl, 0 OH). The spectrum shows a second resonance, at −105 ppm, with a full width at half height of 3.3 ppm, which we assign to Si(3 OSi, 1 OAl, 0 OH). The spectrum shows a third resonance, at −99 ppm, with a full width at half height of 3.4 ppm, which may stem from Si(2 OSi, 2 OAl, 0 OH) or Si(3 OSi, 0 OAl, 1 OH).

WO 2016/080547 A1
U.S. Pat. No. 5,958,370
Pure Appl. Chem., Vol. 80, No. 1, pp. 59-84, 2008

The invention claimed is:

1. A process for preparing a zeolite material comprising a zeolite having an AEI framework and a framework structure comprising a tetravalent element Y, a trivalent element X, and O and a zeolite having a GME or AFI framework, the process comprising:
   (i) preparing a synthesis mixture comprising water, a source of Y, a source of X, an AEI framework structure directing agent, and a source of sodium, wherein the source of Y and/or the source of X comprise sodium;
   (ii) heating the synthesis mixture under autogenous pressure to a temperature ranging from 100° C. to 180° C. for at least 6 h, obtaining the zeolite material comprising the zeolite having an AEI framework and a framework structure comprising a tetravalent element Y, a trivalent element X, and O, and the zeolite having a GME or AFI framework, comprised in its mother liquor;
   wherein the source of Y and the source of X contribute a total of at least 50 weight-% of elemental sodium in the synthesis mixture prepared in (i);
   wherein Y is one or more of Si, Ge, S, Ti, and Zr;
   wherein X is one or more of Al,
   wherein the source of X comprises a sodium aluminate,
   wherein in the synthesis mixture prepared in (i), the synthesis mixture is characterized by a molar ratio of the source of Y, calculated as $YO_2$, relative to the source of X, calculated as $X_2O_3$, ranging from 5:1 to 25:1, a molar ratio of the source of Y, calculated as $YO_2$, relative to the AEI framework structure directing agent ranging from 1:1 to 10:1, and a molar ratio of the source of Y, calculated as $YO_2$, relative to the water ranging from 0.01:1 to 1:1.

2. The process of claim 1, wherein the source of Y and the source of X contribute a total of at least 75 weight-% of elemental sodium in the synthesis mixture prepared in (i).

3. The process of claim 1, wherein in the synthesis of mixture prepared in (i), the source of sodium is the source of X and the source of Y does not comprise sodium, or the source of sodium is the source of Y and the source of X.

4. The process of claim 1, wherein Y comprises Si.

5. The process of claim 1, wherein the source of Y comprises a sodium silicate having the formula $(Na_2SiO_2)_nO$ wherein n is an integer.

6. The process of claim 1, wherein in the synthesis mixture obtained from (i) in (ii), the synthesis mixture is heated to a temperature ranging from 140° C. to 160° C. or 100° C. to 140° C.

7. The process of claim 1, further comprising
   (iv) cooling the mixture obtained from (ii); and
   (iv) separating the zeolite material from the obtained mixture.

8. The process of claim 7, further comprising contacting the zeolite material with a solution comprising ammonium ions to obtain an ammonium form zeolitic material.

9. The process of claim 7, further comprising supporting a metal M on the zeolite material, and wherein the metal M is a transition metal of groups 7 to 12 of the periodic system of elements.

10. The process of claim 9, wherein supporting a metal M on the zeolite material comprises heating a mixture comprising the zeolite material, a source of the metal M, a solvent for the source of the metal M, and optionally an acid to a temperature ranging from 30° C. to 90° C.; and separating a zeolite material comprising the metal M from the mixture.

11. The process of claim 10, wherein the metal M is supported on the zeolite material in an amount ranging from 1 weight-% to 11 weight-% calculated as MO and based on the total weight of the zeolitic material.

12. The process of claim 1, wherein the zeolite having an AEI framework and a framework structure comprising a tetravalent element Y, a trivalent element X, and O is characterized by one or more of:
   (1) a BET specific surface area ranging from 200 $m^2/g$ to 340 $m^2/g$;
   (2) a crystallinity of at least 60% determined by X-Ray Diffraction analysis;
   (3) a Langmuir surface area ranging from 290 $m^2/g$ to 430 $m^2/g$ determined according to DIN 66131.

* * * * *